United States Patent
Ramprashad et al.

(10) Patent No.: US 9,048,977 B2
(45) Date of Patent: Jun. 2, 2015

(54) RECEIVER TERMINAL DRIVEN JOINT ENCODER AND DECODER MODE ADAPTATION FOR SU-MIMO SYSTEMS

(75) Inventors: Sean A. Ramprashad, Los Altos, CA (US); Haralabos C. Papadopoulos, San Jose, CA (US); Giuseppe Caire, South Pasadena, CA (US); Carl-Erik W. Sundberg, Sunnyvale, CA (US)

(73) Assignee: NTT DOCOMO, INC., Tokyo (JP)

( * ) Notice: Subject to any disclaimer, the term of this patent is extended or adjusted under 35 U.S.C. 154(b) by 781 days.

(21) Appl. No.: 12/772,717

(22) Filed: May 3, 2010

(65) Prior Publication Data
US 2011/0110449 A1    May 12, 2011

Related U.S. Application Data

(60) Provisional application No. 61/175,711, filed on May 5, 2009.

(51) Int. Cl.
*H04W 28/16*    (2009.01)
*H04L 1/00*    (2006.01)

(52) U.S. Cl.
CPC ............ *H04L 1/0009* (2013.01); *H04L 1/0003* (2013.01); *H04L 1/0017* (2013.01); *H04L 1/0025* (2013.01)

(58) Field of Classification Search
CPC .................................................... H04L 1/0003
USPC ......................................... 375/260, 267, 278
See application file for complete search history.

(56) References Cited

U.S. PATENT DOCUMENTS 5,903,842 A    5/1999 Wang
5,982,327 A    11/1999 Vook et al.

(Continued)

FOREIGN PATENT DOCUMENTS

EP    1162750 A2    12/2001
EP    1383246 A2    1/2004

(Continued)

OTHER PUBLICATIONS

US Final Office Action for U.S. Appl. No. 11/873,248, dated Sep. 1, 2010, 21 pages.

(Continued)

*Primary Examiner* — Jaison Joseph
(74) *Attorney, Agent, or Firm* — Blakely, Sokoloff, Taylor & Zafman LLP

(57) ABSTRACT

A system, a method and an apparatus are disclosed herein for receiver terminal driven joint encoder and decoder mode adaptation for SU-MIMO transmission. In one embodiment, the system comprises a transmitter that is able to be directed to transmit wireless signals over a multiple-input, multiple output (MIMO) system using any of a plurality of encoding modes; and a user terminal having a receiver comprising a decoding module which has a plurality of decoding modes, each of which can be used to decode communications from the transmitter received over a multiple-input, multiple output (MIMO) channel, wherein at least one encoding mode is operable with multiple of the decoding modes. The system also comprises a joint selection module that is operable to select for the MIMO transmission the decoding mode from the plurality of decoding modes and an encoding mode from the plurality of encoding modes to be used by the transmitter on the channel, the selection being based on receiver-dependent criteria corresponding to the decoding mode associated with the encoding mode and channel information, receiver hardware and state, and application-specific constraints. The joint selection module is operable to send information to identify the encoding mode to the transmitter using a feedback channel.

24 Claims, 5 Drawing Sheets

(56) References Cited

U.S. PATENT DOCUMENTS

| | | |
|---|---|---|
| 6,182,264 B1 * | 1/2001 | Ott .................................. 714/774 |
| 6,629,287 B1 | 9/2003 | Brink |
| 6,804,307 B1 | 10/2004 | Popovic |
| 6,862,552 B2 | 3/2005 | Goldstein et al. |
| 6,901,117 B1 | 5/2005 | Classon et al. |
| 6,976,087 B1 | 12/2005 | Westfall et al. |
| 7,042,856 B2 | 5/2006 | Walton et al. |
| 7,042,858 B1 | 5/2006 | Ma et al. |
| 7,072,295 B1 | 7/2006 | Benson et al. |
| 7,095,812 B2 | 8/2006 | Chan et al. |
| 7,251,768 B2 | 7/2007 | Giannakis et al. |
| 7,308,047 B2 | 12/2007 | Sadowsky |
| 7,310,369 B1 | 12/2007 | Krieger et al. |
| 7,436,895 B1 | 10/2008 | Tujkovic |
| 7,441,045 B2 | 10/2008 | Skene et al. |
| 7,443,925 B2 | 10/2008 | Mehta et al. |
| 7,564,915 B2 | 7/2009 | Lee et al. |
| 7,620,117 B2 | 11/2009 | Chae et al. |
| 7,848,439 B2 * | 12/2010 | She et al. ....................... 375/260 |
| 7,877,097 B2 | 1/2011 | Zhu et al. |
| 7,877,108 B2 | 1/2011 | Wengerter et al. |
| 7,924,775 B2 * | 4/2011 | Khan et al. ..................... 370/328 |
| 8,027,407 B2 | 9/2011 | Papadopoulos |
| 8,042,031 B2 | 10/2011 | Chen et al. |
| 2002/0114404 A1 | 8/2002 | Aizawa et al. |
| 2002/0176431 A1 | 11/2002 | Golla et al. |
| 2003/0002505 A1 | 1/2003 | Hoch et al. |
| 2003/0003863 A1 * | 1/2003 | Thielecke et al. ............... 455/39 |
| 2003/0072254 A1 | 4/2003 | Ma et al. |
| 2003/0235149 A1 | 12/2003 | Chan et al. |
| 2003/0236080 A1 | 12/2003 | Kadous et al. |
| 2004/0013180 A1 | 1/2004 | Giannakis et al. |
| 2004/0022179 A1 | 2/2004 | Giannakis et al. |
| 2004/0042400 A1 | 3/2004 | Horlin et al. |
| 2004/0116146 A1 | 6/2004 | Sadowsky et al. |
| 2004/0165675 A1 | 8/2004 | Ito et al. |
| 2004/0205445 A1 | 10/2004 | Xu |
| 2005/0010675 A1 | 1/2005 | Jaggi et al. |
| 2005/0041751 A1 | 2/2005 | Nir et al. |
| 2005/0047514 A1 | 3/2005 | Bolinth et al. |
| 2005/0068918 A1 | 3/2005 | Mantravadi et al. |
| 2005/0111592 A1 | 5/2005 | Yee |
| 2005/0152391 A1 | 7/2005 | Effros et al. |
| 2005/0185707 A1 | 8/2005 | Hoo et al. |
| 2005/0220040 A1 * | 10/2005 | Petrovic et al. ................ 370/278 |
| 2005/0265280 A1 | 12/2005 | Roh et al. |
| 2006/0002312 A1 | 1/2006 | Delattre et al. |
| 2006/0020560 A1 | 1/2006 | Rodriguez et al. |
| 2006/0023624 A1 * | 2/2006 | Han et al. ....................... 370/204 |
| 2006/0029124 A1 | 2/2006 | Grant et al. |
| 2006/0039489 A1 * | 2/2006 | Ikram et al. .................... 375/260 |
| 2006/0098760 A1 | 5/2006 | Shen et al. |
| 2006/0146716 A1 | 7/2006 | Lun et al. |
| 2006/0146791 A1 | 7/2006 | Deb et al. |
| 2006/0148506 A1 | 7/2006 | Hoo |
| 2006/0176945 A1 | 8/2006 | Li |
| 2006/0276217 A1 | 12/2006 | Khojastepour et al. |
| 2007/0005806 A1 * | 1/2007 | Fitzgibbon et al. ............ 709/246 |
| 2007/0041475 A1 | 2/2007 | Koshy et al. |
| 2007/0066229 A1 | 3/2007 | Zhang et al. |
| 2007/0121499 A1 | 5/2007 | Pal et al. |
| 2007/0147414 A1 * | 6/2007 | Niu et al. ....................... 370/465 |
| 2007/0156919 A1 | 7/2007 | Potti et al. |
| 2007/0198899 A1 | 8/2007 | Yellin et al. |
| 2007/0213013 A1 | 9/2007 | Kim |
| 2007/0223423 A1 | 9/2007 | Kim et al. |
| 2007/0281633 A1 | 12/2007 | Papadopoulos |
| 2007/0286313 A1 | 12/2007 | Nikopour-Deilami et al. |
| 2008/0025430 A1 | 1/2008 | Sadowsky |
| 2008/0032630 A1 | 2/2008 | Kim et al. |
| 2008/0075022 A1 | 3/2008 | Lei et al. |
| 2008/0092028 A1 | 4/2008 | Orio |
| 2008/0101310 A1 | 5/2008 | Marzetta |
| 2008/0123781 A1 | 5/2008 | Pisek et al. |
| 2008/0181339 A1 | 7/2008 | Chen et al. |
| 2008/0212526 A1 | 9/2008 | Oyman |
| 2008/0254749 A1 * | 10/2008 | Ashkenazi et al. ............. 455/69 |
| 2009/0082054 A1 | 3/2009 | Li et al. |
| 2009/0213954 A1 | 8/2009 | Bursalioglu et al. |
| 2009/0225878 A1 | 9/2009 | Papadopoulos et al. |
| 2009/0245408 A1 * | 10/2009 | Mujtaba et al. ................ 375/267 |
| 2009/0268684 A1 | 10/2009 | Lotti et al. |
| 2009/0285323 A1 | 11/2009 | Sundberg et al. |
| 2009/0291699 A1 | 11/2009 | Heath et al. |
| 2009/0296842 A1 | 12/2009 | Papadopoulos et al. |
| 2011/0128917 A1 * | 6/2011 | Ko et al. ........................ 370/328 |

FOREIGN PATENT DOCUMENTS

| | | |
|---|---|---|
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 A1 | 6/2001 |
| WO | 04/001545 A2 | 12/2003 |
| WO | WO 2004/045167 A | 5/2004 |
| WO | WO 2004/025011 A1 | 7/2004 |
| WO | WO 2004/056011 A1 | 7/2004 |
| WO | WO 2005/046081 A1 | 5/2005 |
| WO | WO 2006/029050 A | 3/2006 |
| WO | WO 2007/050860 A | 5/2007 |
| WO | WO 2007/073267 A1 | 6/2007 |
| WO | 2007/087540 A2 | 8/2007 |
| WO | WO 2007/087540 A2 | 8/2007 |
| WO | WO 2007/129990 A1 | 11/2007 |
| WO | WO 2008/057791 A1 | 5/2008 |
| WO | 2008/093964 A2 | 8/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

US Office Action for U.S. Appl. No. 11/939,353 dated Jan. 31, 2011, 15 pages.

Sen, et al., "Cute and jCUTE Concolic Unit Testing and Explicit Path Model-Checking Tool", Computer Aided Verification Lecture Notes in Computer Science, Jan. 1, 2006, pp. 419-423.

Majumdar, et al., "Hybrid Concolic Testing", IEEE 29th International Conference on Software Engineering, May 1, 2007, pp. 416-426.

PCT International Preliminary Report on Patentability for PCT Patent Application No. PCT/US2009/046014, dated Dec. 16, 2010, 9 pages.

PCT International Search Report for PCT Patent Application No. PCT/US2010/033549, Jan. 5, 2011, 5 pgs.

PCT Written Opinion of the International Searching Authority for PCT Patent Application No. PCT/US2010/033549, Jan. 5, 2011, 6 pgs.

European Office Action for European Patent Application No. 08767750.6, dated Jan. 12, 2011, 6 pgs.

PCT International Search Report for PCT Patent Application No. PCT/US2010/027139, Dec. 6, 2010, 5 pgs.

PCT Written Opinion of the International Searching Authority for PCT Patent Application No. PCT/US2010/027139, Dec. 6, 2011, 6 pgs.

European Office Action for European Patent Application No. 08767751.4, Jan. 14, 2011, 5 pgs.

US Office Action for U.S. Appl. No. 12/538,733, Oct. 18, 2011, 11 pgs.

US Office Action for U.S. Appl. No. 12/538,739, Dec. 7, 2011, 23 pgs.

US Final Office Action for U.S. Appl. No. 12/538,733, Mar. 27, 2012, 6 pgs.

(56) References Cited

OTHER PUBLICATIONS

US Final Office Action for U.S. Appl. No. 12/335,409, Mar. 19, 2012, 22 pgs.
US Office Action for U.S. Appl. No. 12/335,389, Apr. 12, 2012, 20 pgs.
PCT International Preliminary Report on Patentability for PCT Patent Application No. PCT/US2010/033549, Nov. 17, 2011, 7 pgs.
US Notice of Allowance for U.S. Appl. No. 11/754,903, Mar. 12, 2012, 8 pgs.
Papadogiannis, et al., "A Dynamic Clustering Approach in Wireless Networks with Multi-Cell Cooperative Processing", IEEE International Conference on Communications, May 19, 2008, pp. 4033-4037.
PCT International Preliminary Report on Patentability for PCT Patent Application No. PCT/US2009/053466, dated Feb. 24, 2011, 9 pages.
PCT International Preliminary Report on Patentability for PCT Patent Application No. PCT/US2009/053471, dated Feb. 24, 2011, 9 pages.
PCT International Preliminary Report on Patentability for PCT Patent Application No. PCT/US2009/054937, dated Mar. 10, 2011, 8 pages.
PCT International Preliminary Report on Patentability for PCT Patent Application No. PCT/US2009/056865, dated Mar. 24, 2011, 12 pgs.
European Office Action for European Patent Application No. 07862325.3, Apr. 7, 2011, 6 pgs.
US Office Action for U.S. Appl. No. 12/209,110 dated Feb. 11, 2011, 20 pages.
US Office Action for U.S. Appl. No. 12/121,649, Apr. 19, 2011, 25 pgs.
US Office Action for U.S. Appl. No. 12/130,821, Feb. 22, 2011, 12 pgs.
US Office Action for U.S. Appl. No. 12/121,634, Mar. 1, 2011, 19 pgs.
US Office Action for U.S. Appl. No. 11/644,638, Apr. 15, 2011, 7 pgs.
European Office Action for European Patent Application No. 09718026.9, Feb. 10, 2011, 3 pgs.
European Office Action for European Patent Application No. 08756664.2, Mar. 17, 2011, 6 pgs.
PCT International Search Report dated Sep. 18, 2008, for PCT/US08/006286, filed May 16, 2008, 4 pages.
Written Opinion of the International Searching Authority dated Sep. 18, 2008, for PCT/US08/006286, filed May 16, 2008, 8 pages.
International Search Report mailed Nov. 6, 2008 for PCT/US08/065675, filed Jun. 3, 2008, 5 pages.
Written Opinion of the International Searching Authority mailed Nov. 6, 2008 for PCT/US08/065675, filed Jun. 3, 2008, 8 pages.
International Search Report for related application WO 08/048651, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
PCT International Search Report dated Apr. 14, 2008 for PCT/US07/23207, 3 pages.
Written Opinion of the International Searching Authority dated Apr. 14, 2008 for PCT/US07/23207, 6 pages.
International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.
International Search Report dated Apr. 17, 2009 for PCT/US2008/076252, 5 pages.
Written Opinion of the International Searching Authority dated Apr. 17, 2008 for PCT/US2008/076252, 9 pages.
Written Opinion of the International Searching Authority dated Apr. 30, 2009 for PCT/US2007/022189, 8 pages.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
PCT International Preliminary Report on Patentability for PCT Patent Application No. PCT/US2008/003274, dated Sep. 24, 2009, 10 pages.
PCT International Search Report for PCT Patent Application No. PCT/US2007/013074, dated Dec. 2, 2009, 8 pgs.
Written Opinion of the International Searching Authority for PCT Patent Application No. PCT/US2009/046014, dated Nov. 27, 2009, 8 pgs.
PCT International Preliminary Report on Patentability for PCT Patent Application No. PCT/US2007/013074, dated Dec. 30, 2009, 8 pages.
PCT International Search Report for PCT Patent Application No. PCT/US2008/006287, dated Oct. 2, 2008, 6 pgs.
Written Opinion of the International Searching Authority for PCT Patent Application No. PCT/US2008/006287, dated Oct. 2, 2008, 7 pgs.
PCT International Preliminary Report on Patentability for PCT Patent Application No. PCT/US2008/065675, dated Dec. 17, 2009, 8 pages.
PCT International Search Report for PCT Patent Application No. PCT/US2009/054937, dated Dec. 30, 2009, 7 pgs.
Written Opinion of the International Searching Authority for PCT Patent Application No. PCT/US2009/054937, dated Dec. 30, 2009, 7 pgs.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
US Office Action for U.S. Appl. No. 12/040,653, dated Dec. 11, 2009, 33 pages.
US Office Action for U.S. Appl. No. 11/644,638, dated Sep. 22, 2009, 13 pages.
US Office Action for U.S. Appl. No. 11/754,903, dated Mar. 29, 2010, 11 pages.
US Office Action for U.S. Appl. No. 11/873,248, dated Mar. 31, 2010, 18 pages.
Lattice Semiconductor Corp., "Turbo Decoder", IP Data Sheet, 2003, 6 pages.
Kao, Chien-Yu, "A Bi-directional SOVA with Normalization for Turbo Decoding", Jun. 2006, Tainan, Taiwan, 72 pages.
Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.
Alamouti, Siavash M., "A Simple Transmit Diversity Technique for Wireless Communications", IEEE Journal on Select Areas in Communications, vol. 16, No. 8, Oct. 1998, pp. 1451-1458.
Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.
Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.
Lee, Inkyu, et al., "Space-Time Bit-Interleaved Coded Modulation for OFDM Systems", IEEE Transactions on Signal Processing, vol. 52, No. 3, Mar. 2004, pp. 820-825.
Lee, Heunchul, et al., "A Flexible Space-Time Coding System with Unequal Error Protection", IEEE, 2005, 5 pages.

(56) References Cited

OTHER PUBLICATIONS

Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.

Lee, Inkyu, et al., "Code Construction for Space-Time Bit-Interleaved Coded Modulation Systems", IEEE Communications Society, 2004, 5 pages.

Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.

Lee, Inkyu, et al., "Code Design of Space-Time Bit-Interleaved Coded Modulation Systems for Maximum Diversity", ICC, Jun. 2004, 11 pages.

Taddei, Herve, et al., Mode Adaptive Unequal Error Protection for Transform Predictive Speech and Audio Coders, IEEE, 2002, pp. 165-168.

Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.

Wong, K., "The Soft-Output M-Algorithm and Its Applications", PhD Thesis, Queens University, Kingston, Canada, Aug. 2006, 263 pages.

Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.

Seshadri, N., et al., "List Viterbi Decoding Algorithms with Applications", IEEE Transactions on Communications, vol. 42, No. 2/3/4, Feb./Mar./Apr. 1994, pp. 313-323.

Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.

Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.

Wong, K.K.Y., et al., "Low-complexity space-time turbo equalizer with the soft-output M-algorithm for frequency-selective channels", IEEE International Conference on Communications, vol. 4, May 2005, pp. 2251-2255.

Wong, K.K.Y., et al., "Bi-directional soft-output m-algorithm for iterative decoding", IEEE International Conference on Communications, vol. 2, Jun. 2004, pp. 792-797.

Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.

Papadopoulos, H., et al., "Wideband space-time coded systems with non-collocated antennas", Radio and Wireless Symposium, 2008,IEEE, Jan. 22, 2008, pp. 307-310.

Lee, Inkyu, et al., "Diversity Analysis for Space-Time, Bit-Interleaved Coded Modulation Systems", Korea University, Seoul, Korea, Jan. 2007.

Gencata, et al., "Virtual-topology adaptation for WDM mesh networks under dynamic traffic," Proceedings of IEEE Infocom 2002, vol. 1, Jun. 23, 2002, pp. 48-56.

Koetter, R., et al., "Beyond routing: an algebraic approach to network coding," Proceedings of IEEE Infocom 2002, vol. 1, Jun. 23, 2002, pp. 122-130.

Del Re, Enrico, et al., "Next-Generation Mobile Satellite Networks," IEEE Communications Magazine, vol. 40, No. 9, Sep. 1, 2002, pp. 150-159.

Ernest, P.H.H., et al., "An efficient algorithm for virtual topology reconfiguration in WDM optical ring networks," Proceedings of 10th Conference on Computer Communications and Networks, Oct. 15, 2001, pp. 55-60.

Fasolo, E., "Network coding techniques," www.cs.virginia.edu/{yw5s/Network%20coding.ppt, Mar. 7, 2004, pp. 1-14.

Chou, P.A., et al., "Network Coding for the Internet and Wireless Networks", www.eecs.umich.edu/systems/ChouSeminar.ppt, Mar. 28, 2006, pp. 1-29.

Ahlswede, R., et al., "Network Information Flow", IEEE Transactions on Information Theory, IT-46(4), Jul. 2000, pp. 1204-1216.

Ho, T., et al., "The Benefits of Coding Over Routing in a Randomized Setting", in the Proceedings of the International Symposium on Information Theory (ISIT), Jun. 2003, pp. 1-6.

Katti, S., et al., "XORs in the Air: Practical Wireless Network Coding", in the Proceedings of the ACM Special Interest Group on Data Communication (SIGCOMM), Sep. 2006, 12 pages.

Koetter, R., et al., "An Algebraic Approach to Network Coding", IEEE/ACM Transactions on Networking, vol. 11, No. 5, Oct. 2003, pp. 782-795.

Li, S. R., et al., "Linear Network Coding", IEEE Transactions on Information Theory, IT-49(2), Feb. 2003, pp. 371-381.

Chou, P.A., et al., "Practical Network Coding", 51st Allerton Conference on Communication, Control and Computing, Oct. 2003, 10 pages.

Cormen, T.H., et al., "Introduction to Algorithms", 2nd Edition, MIT Press and McGraw-Hill, 2001, pp. 643-700.

Jafarkani, H., "Space-Time Coding, Theory and Practice", Cambridge University Press, 2005.

Yiu, S., et al., "Distributed Space-Time Block Coding", IEEE GLOBECOM 2005 Proceedings, Nov. 2005.

Su, W., et al., "Signal Constellations for Quasi-Orthogonal Space-Time Block Codes with Full Diversity", IEEE Transactions on Information Theory, Oct. 2004, pp. 2231-2347.

Jafarkani, H., "A Quasi-Orthogonal Space-Time Block Code", IEEE Transactions on Communications, Jan. 2001, 4 pages.

Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.

Sharma, N. et al.: "Improved Quasi-Orthogonal Codes Through Constellation Rotation," IEEE Trans. Communications, pp. 332-335, Mar. 2003, 3 pages.

Wang, H. et al.: "Upper Bounds of Rates of Space-Time Block Codes from Complex Orthogonal Designs," IEEE Trans. Information Theory, pp. 2788-2796, Oct. 2003, 9 pages.

El Gamal, H. et al., "Distributed Space-Time Filtering for Cooperative Wireless Networks", GLOBECOM'03, Dec. 2003, pp. 1826-1830.

Sezgin, A., et al., "On EXIT-Chart Analysis of Coherent and Non-Coherent Space-Time Codes", Smart Antennas, 2004, pp. 49-56.

Horn, R.A., et al., "Matrix Analysis", Cambridge University Press, New York, 1994.

Tse, D., et al., "Fundamentals of Wireless Communication", Cambridge University Press, May 2005.

Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.

Guerin, R., et al., "Quality-of-Service in Packet Networks: Basic Mechanisms and Directions", Invited Paper, Computer Networks, vol. 31, No. 3, Feb. 1999, pp. 1-16.

Zhang, H., "Service Disciplines for Guaranteed Performance Service in Packet-Switching Networks", in the Proceedings of the IEEE, vol. 83, No. 10, Oct. 1995, pp. 1-23.

Caire, G., et al., "Achievable Throughput of MIMO Downlink Beamforming and Limited Channel Information", Proceedings of IEEE PIMRC, Aug. 2007.

Medard, M., "The Effect upon Channel Capacity in Wireless Communication of Imperfect Knowledge of the Channel", IEEE Transactions on Information Theory, May 2000, pp. 935-945.

Marzetta, T.L., "How Much Training Is Required for Multi-User MIMO?", ACSSC96, Asilomar Conference Oct. 2006.

(56) References Cited

OTHER PUBLICATIONS

Viswanath, P., et al., "Sum Capacity of the Multiple Antenna Gaussian Broadcast Channel and Uplink-Downlink Duality", IEEE Transactions on Information Theory, Aug. 2003, pp. 1912-1923.
Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.
Joham, M., et al., "Linear Transmit Processing in MIMO Communications Systems", IEEE Transactions on Signal Processing, Aug. 2005, pp. 2700-2712.
Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.
Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.
Catt, "Non-codebook based pre-coding for E-UTRA TDD Downlink", 3rd Generation Partnership Project, Oct. 4, 2006, pp. 1-3.
Gomadam, K.S., et al., "Techniques for Multi-user MIMO with Two-way Training", IEEE International Conference on Communications, May 19, 2008, pp. 3360-3366.
Michalke, Clemens, et al., "Linear MOMO Receivers Vs. Tree Search Detection: A Performance Comparison Overview", IEEE Internatinal Symposium on Personal, Indoor and Mobile Radio Communications, Sep. 11, 2006, pp. 1-7.
Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
Stiglmayr, Stephan, et al., "Adaptive Coding and Modulation in OFDM Systems using BICM and Rate-Compatible Punctured Codes", 7 pages.
G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.
Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.
Yiu, Simon, et al., "Optimization of Distributed Space-Time Filtering", IEEE 62nd Vehicular Technology Conference, Sep. 2005, pp. 1829-1833, Piscataway, New Jersey, USA.
Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.
Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.
Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.
Sun, Sumei, et al., "Pseudo-Inverse MMSE Based QRD-M Algorithm for MIMO OFDM", Jan. 1, 2006, pp. 1545-1549, vol. 3.
Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
US Final Office Action for U.S. Appl. No. 11/644,638, dated Apr. 29, 2010, 22 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
US Final Office Action for U.S. Appl. No. 12/040,653, dated Jun. 15, 2010 , 40 pages.
US Notice of Allowance for U.S. Appl. No. 12/538,733, dated Apr. 26, 2012 , 6 pgs.
US Office Action for U.S. Appl. No. 12/476,066, dated May 30, 2012 , 14 pgs.
US Notice of Allowance for U.S. Appl. No. 12/335,409, dated Jul. 19, 2012 , 8 pgs.
US Office Action for U.S. Appl. No. 12/546,471, dated May 21, 2012 , 11 pgs.
US Office Action for U.S. Appl. No. 12/209,110, dated Jun. 12, 2012 , 39 pgs.
US Notice of Allowance for U.S. Appl. No. 11/644,638, dated Jun. 9, 2011 , 11 pgs.
US Notice of Allowance for U.S. Appl. No. 12/121,634, dated Aug. 12, 2011 , 9 pgs.
Li, et al., "Full Diversity Distributed Space-Time Trellis Codes for Asynchronous Cooperative Communications", Proceeding of the IEEE 2005 International Symposium on Information Theory, Sep. 4, 2005, 6 pgs., Adelaide, South Australia, Australia.
Jing, et al., "Distributed Space-Time Codes in Wireless Relay Networks", 2004 IEEE Sensor Array and Multichannel Signal Processing Workshop, Jul. 21, 2004, pp. 249-253.
Japanese Office Action for related Japanese Patent Application No. 2009-513327, Aug. 7, 2012, 3 pgs. *English Translation*.
US Final Office Action for U.S. Appl. No. 12/209,110, dated Jul. 14, 2011 , 26 pgs.
US Office Action for U.S. Appl. No. 12/335,409, dated Aug. 16, 2011 , 20 pgs.
US Notice of Allowance for U.S. Appl. No. 11/664,638, dated Jun. 9, 2011 , 10 pgs.
US Office Action for U.S. Appl. No. 11/754,903, dated Jun. 6, 2011, 11 pgs.
US Office Action for U.S. Appl. No. 11/644,638, dated Sep. 30, 2010 , 24 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 11/939,353, dated Sep. 22, 2010, 15 pages.
PCT International Search Report for PCT Patent Application No. PCT/US2009/046014, dated Nov. 27, 2009, 7 pgs.
Written Opinion of the International Searching Authority for PCT Patent Application No. PCT/US2007/013074, dated Dec. 2, 2009, 8 pgs.
PCT International Search Report for PCT Patent Application No. PCT/US2009/053471, Dec. 15, 2009, 7 pgs.
PCT Writen Opinion of the International Searching Authority for PCT Patent Application No. PCT/US2009/053471, Dec. 15, 2009, 9 pgs.
PCT International Preliminary Report on Patentability for PCT Appl. No. PCT/US2009/034758, Aug. 31, 2010, 6 pgs.

(56) References Cited

OTHER PUBLICATIONS

PCT International Preliminary Report on Patentability for PCT Appl. No. PCT/US2009/046014, Dec. 6, 2010, 7 pgs.
PCT International Search Report for PCT Patent Application No. PCT/US2009/046014, Nov. 27, 2009, 3 pgs.
PCT Writen Opinion of the International Searching Authority for PCT Patent Application No. PCT/US2009/046014, Nov. 27, 2009, 6 pgs.
PCT International Preliminary Report on Patentability for PCT Appl. No. PCT/US2009/053472, Feb. 15, 2011, 5 pgs.
European Office Action for European Patent Application No. 09715574.1, Jan. 11, 2012, 6 pgs.
European Office Action for European Patent Application No. 08832132.8, Feb. 10, 2012, 5 pgs.
US Office Action for U.S. Appl. No. 12/700,585, dated Oct. 15, 2012, 9 pgs.
US Final Office Action for U.S. Appl. No. 12/209,110, dated Dec. 28, 2012, 40 pgs.
US Final Office Action for U.S. Appl. No. 12/476,066, dated Jan. 8, 2013, 16 pgs.
US Final Office Action for U.S. Appl. No. 12/538,739, dated Aug. 3, 2012, 35 pgs.
US Office Action for U.S. Appl. No. 12/546,471, dated Dec. 26, 2012, 11 pgs.
US Office Action for U.S. Appl. No. 12/558,367, dated Feb. 15, 2013, 13 pgs.
Taddei, Nerve, et al., "Mode Adaptive Unequal Error Protection for Transform Predictive Speech and Audio Coders", Proceedings of the IEEE International Conference in Acoustics, Speech, and Signal Processing (ICASSP 2002), vol. I, pp. 865-868, May 2002.
Marsch, Patrick, et al., On multicell cooperative transmission in backhaul-constrained cellular systems, Annals of Telecommunications, May 1, 2008, pp. 253-269, vol. 63, No. 5/6.
Lang, Yidong, et al., "A Novel Resource Allocation Strategy for Distributed MIMO Multi•Hop Multi-Commodity Communications", JEEE International ITG Workshop on Smart Antennas, Feb. 26, 2008, pp. 125-132.
Karakayali, M., et al., "On the Maximum Common Rate Achievable in a Coordinated Network", Mar. 3, 2006, 6 pages.
Caire, G., et al., "Multiuser MIMO Downlink with Limited Inter-Cell Cooperation: Approximate Interference Alignment in Time, Frequency, and Space", 8 pages.
Boccardi, F., et al., "Limited Downlink Network Coordination in Cellular Networks", The 18th Annual IEEE International Symposium on Personal, Indoor, and Mobile Radio Communications (PIMRC '07), 5 pages.
Caire, G., et al., "Multiuser MIMO Achievable Rates with Downlink Training and Channel State Feedback", 31 pages.
Caire, G., et al., "On the Achievable Throughput of a Multiantenna Gaussian Broadcast Channel", IEEE Transactions on Information Theory, vol. 49, No. 7, Jul. 2003, pp. 1691-1706.
Ernesto Zimmermann, "Complexity Aspects in Near-Capacity MIMO Detection-Decoding", Jan. 1, 2007, pp. 39-70.
Ernesto Zimmermann, et al., "Unbiased MMSE Tree Search Detection for Multiple Antenna Systems", Proceedings Ofthe International Symposium on Wireless Personal Multimedia Communications, Sep. 1, 2006, pp. 806-810.
Office Action with English translation from related Japanese Application No. 2012-509901, mailed Feb. 25, 2014 (received from Foreign Associate on Mar. 6, 2014), 7 pages.

\* cited by examiner

RECEIVER TERMINAL DRIVEN JOINT ENCODER AND DECODER MODE ADAPTATION FOR SU-MIMO SYSTEMS

PRIORITY

The present patent application claims priority to and incorporates by reference the corresponding provisional patent application Ser. No. 61/175,711, titled, "Receiver Terminal Driven Joint Encoder and Decoder Mode Adaptation for SU-MIMO Systems," filed on May 5, 2009.

RELATED APPLICATIONS

The present application is related to and incorporates by reference U.S. patent application Ser. No. 12/538,736, entitled "Channel Classification and Rate Adaption for SU-MIMO Systems," filed Aug. 10, 2009; U.S. patent application Ser. No. 11/644,638, entitled "A Method and Apparatus for Asynchronous Space-Time Coded Transmission from Multiple Base Stations over Wireless Radio Networks," filed Dec. 21, 2006; U.S. patent application Ser. No. 11/939,353, entitled "A Method and Apparatus for Wideband Transmission from Multiple Non-Collocated Base Stations over Wireless Radio Networks," filed Nov. 13, 2007; U.S. patent application Ser. No. 12/121,649, entitled "Adaptive Soft Output M-algorithm Receiver Structures," filed May 15, 2008; U.S. patent application Ser. No. 12/130,821, entitled "Method and Apparatus for Transmission from Multiple Non-Collocated Base Stations over Wireless Radio Networks," filed May 30, 2008; and U.S. patent application Ser. No. 12/335,389, entitled "Tree Position Adaptive Soft Output M-Algorithm Receiver Structures," filed Dec. 15, 2008.

FIELD OF THE INVENTION

The present invention relates to the field of rate adaptation schemes for single-user multiple-input multiple-output (SU-MIMO) systems; more particularly, the present invention relates to receiver terminal driven joint encoder and decoder modes adaptation for SU-MIMO systems.

BACKGROUND OF THE INVENTION

Future wireless systems require a more effective utilization of the radio frequency spectrum in order to increase the data rate achievable within a given transmission bandwidth. This can be accomplished by employing multiple transmit and receive antennas combined with signal processing, techniques commonly referred to as Multiple Input Multiple Output (MIMO) communication techniques. A number of recently developed techniques and emerging standards are based on employing multiple antennas at a base station and the mobile to improve the either the reliability of data communication over wireless media and/or the effective data rate delivered. These diversity/range (reliability) and multiplexing (throughput) benefits depend are dictated by the number of transmit and the number of receive antennas in the system and the type of transmission used. A system in which all transmit antennas and receive antennas are used to serve a single user are typically referred to as single-user MIMO systems.

Many existing and emerging wireless system standards supporting SU-MIMO. Here, for a given "resource block channel" in time and/or frequency, a scheduler chooses one among many users. For downlink communication, a point-to-point SU-MIMO transmission is used from the transmitter to the receiver of the scheduled user. Such a transmission is formed based on the encoding mode, selected often by the transmitter. This selection is based on feedback information provided by the scheduled user.

A number of systems around this general idea have been proposed for SU-MIMO based transmission. Some state-of-the-art schemes rely on providing high data rates via wideband transmission that relies on the use of OFDM. OFDM is attractive as it makes an equalizer unnecessary. With multi-level modems, coded modulation systems can be designed by means of an outer binary convolutional code and an interleaver in a so-called bit-interleaved coded modulation (BICM) system. Many state-of-the art systems employ coded OFDM/MIMO based transmission of this (or a similar) form, whereby the outer code and modulation scheme determine the rate of the transmission. Such a combination can be thought of as a transmission mode of the system.

The typical modes include an outer binary code with rate, indicated by a value $R_c$, followed by an interleaver and a mapper of groups of bits to complex valued symbols, adhering to a modulation scheme, e.g. a QAM constellation of size Q. In a BICM or D-BLAST type system, these symbols are passed in round robin fashion to the antennas for OFDM transmission over the appropriate resource block. Typically, the users are scheduled for transmission by looking at a channel quality level indicator (CQI), which often defines a simple measure such as the nominal received signal level. This helps determine the transmission rate to be used, as defined by the outer code's rate $R_c$ and the modulation scheme.

In rate-adaptation schemes, it is important that the system rate is well matched to the channel's ability to support a certain rate. If not, an outage event will inevitably occur if a too high transmission rate is attempted. Although CQI values can prove some indicator of the achievable rates in single-input single-output (SISO) transmission, simple CQI feedback such as a nominal receive signal level are less meaningful for MIMO transmission.

Indeed, it is possible that two different MIMO channels with the same CQI level could support different rates over the channel. In other words, a CQI level indicator is in general insufficient in capturing the best rates that a specific modem can support over a MIMO channel. Indeed, even in the case that the CQI indicator is chosen as the capacity of the MIMO channel, which would seem to remove uncertainty in the supported rate, a given modem may only be able to support different rates on such distinct MIMO channels. That is, a given combination of $R_c$ and Q, may behave differently on such distinct MIMO channels.

Finally, a receiver can always transmit full knowledge of the channel to the transmitter. This in general may require a very high feedback overhead. In addition, channel information itself may not sufficiently be able to determine actual receiver performance. Specifically, different receiver algorithms, even for the same channel and same modem, may behave very differently in terms of aspects such as bit-error performance and complexity. Thus, unless the transmitter has such knowledge of the receiver algorithm, it may not make the correct decision for a given mobile terminal having its own particular implementation of receivers. As a result, there is an inherent inefficiency in transmitter-driven rate adaptation schemes for SU-MIMO. It also does not support the ability of a single receiving terminal to have multiple potential receivers at its disposal, and to potentially choose in an adaptive way which receiver algorithm is used.

SUMMARY OF THE INVENTION

A system, a method and an apparatus are disclosed herein for receiver terminal driven joint encoder and decoder mode adaptation for SU-MIMO transmission. In one embodiment, the system comprises a transmitter that is able to be directed to transmit wireless signals over a multiple-input, multiple output (MIMO) system using any of a plurality of encoding modes; and a user terminal having a receiver comprising a decoding module which has a plurality of decoding modes, each of which can be used to decode communications from the transmitter received over a multiple-input, multiple output (MIMO) channel, wherein at least one encoding mode is operable with multiple of the decoding modes. The system also comprises a joint selection module that is operable to select for the MIMO transmission the decoding mode from the plurality of decoding modes and an encoding mode from the plurality of encoding modes to be used by the transmitter on the channel, the selection being based on receiver-dependent criteria corresponding to the decoding mode associated with the encoding mode and channel information, receiver hardware and state, and application-specific constraints. The joint selection module is operable to send information to identify the encoding mode to the transmitter using a feedback channel.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
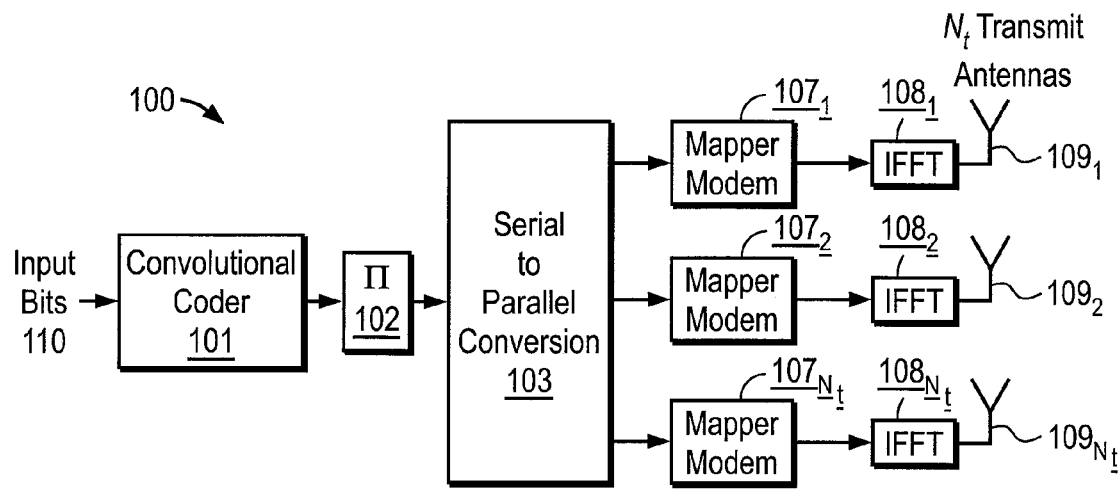
FIG. 1 illustrates one embodiment of a transmitter structure for a MIMO/OFDM system with BICM.

In embodiments of this invention, the process for performing the transceiver selection (i.e. joint encoder and decoder mode selection) based on knowledge of the state of the MIMO channel is linked to the rates that could be achievable via SU-MIMO transmission via any code/modem scheme, with modifications taking into account the decoder modes at the disposal of each receiver, where such modifications include consideration for the performance of different encoder modes with different decoder modes and energy usage, rate and QoS constraints at the receiver. In one embodiment, the SU-MIMO channel state information is first established based on pilot tones in the OFDM system. Capacity estimates are computed at the receiver for the given channel realization and each modem choice (instead of a single CQI index).

In one embodiment, the receiver's selection of the encoding mode is based not only on the rates and encoding modes that the channel can support, but also on the decoder modes that are available to the given receiver, their complexity and performance trade-offs, and potentially an additional set of criteria including QoS requirements, and energy or power usage constraints at the receiver.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Embodiments of the present invention relate in general to rate adaptation schemes for single-user multiple-input multiple-output (SU-MIMO) systems, though it provides functionality that go beyond simply adapting the transmission rate that are useful in creating an efficient SU-MIMO system.

Embodiments of the present invention include a joint encoding mode and decoder mode adaptation scheme. While an encoding mode specifies a transmission rate, embodiments of the present invention support (and encourage) the idea of allowing for one or more encoding modes targeting the same transmission rate. In fact, different encoding modes targeting the same rate may not necessarily be able to create successful transmissions over a given channel. This is true even when the given channel is able to support a rate equivalent to the transmission rate of such encoding modes. Embodiments of the invention also have one or typically more decoding modes for each encoding mode. Thus, while there is rate adaptation in embodiments of the invention, the encoding mode and decoding mode adaptation goes beyond simply aspects in basic rate adaptation. Furthermore, an embodiment of the invention allows for direct inclusion of other aspects such as application or receiver-terminal requirements in the decision process. These aspects depend on the aspects such as the decoding mode selection, and can have strong relevance to how well the receiver-terminal uses available power or meets the quality of service requirements of various applications.

In embodiments of the invention, the focus is on a class of multiple-input multiple-output (MIMO) schemes referred to in the literature as single-user MIMO (SU-MIMO) systems. In such systems, a transmitter, using multiple transmission or output antennas, creates and sends a wireless transmission to a single user that has multiple receive or input antennas. Some principles clearly apply also to the single-input single-output (SISO) systems. It is known that when combined with signal processing, multiple transmit and receive antennas can yield communication links with increased bandwidth efficiency (data rate), extended power efficiency (range), or both. However, the ability of an encoding mode to be able to transmit over a channel is characterized by more than simply the rate of the mode or the capacity of the channel. Also, in MIMO systems, an encoding mode (EM) can be coupled with multiple and decoding mode (DM) choices with varying decoding complexity requirements, and the performance trade-offs of different EM-DM pairs can vary from channel to channel in a non-trivial manner.

Given the inter-relation between EM-DM pairs and channels, the benefit of an embodiment of the invention is that the joint selection will result in higher system performance since the practical aspects of the interplay between the EM and DM are directly accounted for in the decision process. This reduces events such as outage. In addition, application and terminal requirements such as bit-error-rate performance and complexity can be also be directly accounted for in the decision process.

Embodiments of the invention are primarily of interest for use in the forward link (although it can be applied in the reverse link). The adaptation scheme is receiver-terminal (RT) driven, implemented for example at the mobile terminal in downlink communication in a mobile system. For the given channel, the RT chooses the coding and modulation (C&M) parameters (used for transmission) and the preferred decoder module (used by the RT). This C&M information defines the encoding method or mode (EM) to be used at the transmitter. The decoder module is selected from a number of decoder module choices.

The C&M format is fed back to the transmitter by use of a feedback channel (e.g., a low bit rate feedback channel). Optionally, additional information may be sent such as the decoder module selection, the expected performance of this selection (e.g., bit-error rate, predicted QoS level), etc. Such optional information may allow the transmitter to consider other potential variation in its operation. For example, it may allow the scheduler located at the transmitter to consider modifications on the way it schedules users. However, this optional information is not essential to all embodiments.

Note, the coding and modulation (C&M) parameters imply a transmission rate. Thus, rate adaptation is a part of an embodiment of the invention. However, different C&M parameters can support the same rate. More concisely, the C&M parameters define the EM, and different EMs can have the same transmission rate. We will use the terms C&M and EM to mean the same thing in the description to follow.

A decoder module (DM) applies to a particular EM. Thus the selection of the DM and C&M implies a transceiver selection, which is another way to view an embodiment of the invention.

While a C&M can be selected in a way to ensure that the delivered rate to the RT can be received theoretically for a given channel, in reality different DMs can be used with the same transmitter module, producing different results.

In particular, a key aspect of an embodiment of the invention is to use the fact that different potential DMs, even for the same C&M selection, can often provide different tradeoffs depending on the channel. Tradeoffs include different complexity and bit-error rate performances. In one embodiment, knowledge of such DM related tradeoffs is available to and used by the selection algorithm.

Furthermore, tradeoffs may also extend and be related to performance requirements/tradeoffs dictated either by the application or the RT itself. For example, each DM can, for a given channel, achieve one or more expected bit-error rate points, each with a given computational cost to the RT. In one embodiment, the RT decides, based on channel knowledge, and its own hardware and/or application requirements, what DM is suitable for the given channel. Thus, benefits in terms of application performance, and RT performance such as battery life, can be supported by the joint C&M and DM selection scheme of an embodiment of the invention.

Furthermore, the ability to do this selection for MIMO systems goes beyond basic measures such as a "Channel Quality Indicator" or capacity metrics based on simplified assumptions such the use of Gaussian signals and infinite block lengths. In fact, channels with the same QCI do not necessarily support the same rates in MIMO systems, and Encoding Modes (EMs) with the same transmission rate may not necessarily be supportable by the same channel. Practical restrictions based on the finite nature of C&M modes, and practical DM designs, are important and taken into account by embodiments of the invention. These lead to more accurate selections, and benefits to system, application and RT performance as outlined above.

A More Detailed Description

An embodiment of the invention includes methods for RT-driven transceiver adaptation for SU-MIMO wireless systems. An embodiment of the invention uses a joint C&M and a decoder mode (DM) selection module residing at the receiving terminal (RT). For a given channel, the module uses an estimate of the channel along with DM performance data, and possibly application/RT knowledge and criteria, to select the encoder mode (EM), corresponding to a set of C&M parameters, together with the decoder mode to be used.

The C&M parameters are selected from a list of possible encoder modes (EMs) in the system. Multiple C&M parameters may support the same target transmission rate. The encoder mode is implemented in the transmitter. The DM is chosen from the list of decoder module options at the disposal of the RT. Multiple DMs can be present for each EM. The DM is run at the RT.

Some of the possible choices and criteria may be RT-dependent, such as, for example, but not limited to, which DM modes are implemented by the manufacturer in the RT, and/or what complexity can be supported by the RT.

Some of the possible choices and criteria may be RT-state dependent, such as, for example, but not limited to, the remaining battery life or target battery life of the RT. This may dictate for example an upper bound on the target energy to be extended in receiving a certain number of bits, e.g. a limit on the number of joules of instruction counts expended per kilobit of received data.

Some criteria and choices may be application dependent, such as, for example, but not limited to, a target bitrate and/or bit-error rate of the application. For example, data applications may require very low bit-error rates, while media applications such as streaming can tolerate higher bit-error rates. The unit can select the joint C&M and DM choice that meets such application requirements given the channel, exploiting additionally DM characteristics such as complexity, etc.

Some criteria may depend on past selections and past channels over a period of operation by the RT and/or application running. For example, the RT may choose to temporarily increase the amount of energy is will expend per received bit to gain a high bitrate when it sees (temporarily) an atypically favorable channel. The ability to support a very high rate transmission, at a very high coding rate and/or high constellation modulation, may require a very complex DM with a very large energy requirement of decoding computation per received bit. Doing so may make sense if indeed many past channels and transmissions could only support low rates.

One key observation in such examples is that the joint selection of C&M (EM) and DM selection is important in achieving the above performance criteria.

After a C&M and DM selection, the RT feeds back to the transmitter the C&M parameters that are to be used by the transmitter for communicating to the receiver. This C&M selection implies an EM, though it does not necessarily imply or specify the DM. The system may optionally also feed back the DM choice or characteristics (e.g. bit-error rate expected) of the decoder module the RT will be using.

In one embodiment, the selection process uses:
1) Knowledge of the channel, e.g. an estimate of the channel;

2) A metric that measures the ability of the C&M option, given the channel, to reliably support the rate it operates at; and
3) A mechanism to
   a. specify and describe each DM characteristics such as error-rate (when used on the given channel) and complexity,
   b. account for the ability to practically support delivery by a C&M mode based on a given DM's characteristics, and
   c. account for other DM performance characteristics of interest in the final C&M/DM joint decision.

Furthermore, in one embodiment, the algorithm operates in the context of
4) A general MIMO transmission system These general aspects, common to all embodiments will now be discussed.

Channel Estimation

This is an aspect that already exists in many wireless systems, and known to those familiar with the state of the art. For example, existing and emerging SU-MIMO OFDM systems for wireless environments dedicate certain tones to pilots, i.e., to sending probing signals (known to the RTs) in order for the receivers to obtain channel state information (CSI). According to the techniques described herein, based on these measurements of these probing signals, an estimate of the CSI is obtained. Such techniques are known to those familiar with the state of the art.

Rates Supported by Each C&M Mode Given the Channel Estimate

Based on an estimate of the CSI at the RT, the selection of the C&M mode and the decoder mode is performed (in general) jointly at the RT by using one or more metrics that is able to determine which C&M options can be supported by the channel.

One such metric of interest is formed based on an estimate of the mutual-information of the given measured (estimated) channel. It is well known that a MIMO channel with a high degree of scattering can support a higher data rate than a similar-power MIMO channel with a low degree of scattering. The mutual information estimate, at a first order, can be used to establish a baseline for the channel quality and the ability of the channel to support a certain data rate.

The supported rate however goes beyond simply scattering of the channel. Each C&M coding mode corresponds to a choice of coding parameters such as, for example, all or a subset of the size "Q" (and potentially type) of the modulation format, the mapping of bits to symbols, the mapping of symbols to the modulation symbols, the type of the outer code and its coding-rate. Other coding parameters could be chosen, such as, for example an inner space-time block code. Thus a coding mode may have an inherent loss with respect to the ideal performance. Such a loss may be characterized by a penalty or gap value, which can be subtracted from the mutual information estimate. Thus, in one embodiment, in order for a C&M to be deemed to support a given rate over a channel, the mutual information estimate minus the gap must be greater than the rate targeted by the C&M. Such a gap may be specified for each C&M. Such a gap may be additionally modified for each DM as described in [0053]. Such a gap can also adapt additionally to the channel.

The mutual information estimate depends on these practical specifics of the C&M mode, and so takes into account the modulation symbols to be used, the particular design of the channel code, the mapping of bits to symbols, the number of symbols, etc. It is not simply a theoretical capacity bound which relies on ideal assumptions such as Gaussian signals, infinite block length, etc.

Specifying and Accounting for DM Characteristics

The ability of an EM (C&M) mode to support delivery for a channel is only a first step in the adaptation process. Practical limits of decoding (and also implicitly the channel code used) also influence whether or not the bits can be delivered reliably over the channel for the EM. Thus, the gap from mutual information is also a function of the DM.

The family of decoder modes at the disposal of the RT for a given EM may include at least one, and preferably more than one, DM options. In general, the multiple DMs per coding mode represent different performance vs. complexity trade-offs.

One such example of multiple DMs are formed from iterative decoders. Such decoders are able to make multiple decoding passes on the received signal, with each subsequent passes often improving the estimate of received bits. This provides a simple example where a family of DM options is formed from a particular decoder at a given number "Nit" of iterations. The complexity increases with the number "Nit" of iterations.

A DM can also consist of combinations of different basic modes, for example a first iteration using a particular decoding approach and a second iteration using another decoding approach.

Once an RT has at its disposal a number of basic approaches, multiple DM options can be formed from various combinations of options over various iteration strategies.

For each C&M mode and DM pair at its disposal, with a pair being denoted by (C&M,DM), the selection process in the RT has available to it certain performance characteristics.

In one embodiment, this information is given by a "Gap-from-Supported-Rate" value (or other similar transceiver performance value regarding the performance) of this (C&M, DM) pair. This value adjusts the mutual information estimate to account for practical limitations. Examples are given later. Such gaps can be determined offline by testing different (C&M, DM) pairs with different known channels. Testing would reveal the supported rate for each channel, the bit-error rate performance for each pair given a channel, the complexity of decoding, how complexity changes bit-error-rate performance, etc. Often for a given group of channels having the same supported rate, the bit-error rate performance may vary for a given DM. In such a case, gaps can be defined with respect to some distribution of bit-error-rates, for example the gap considering the "x" percentile bit-error rate, where "x" can vary between 0 and 100. Gaps can also be additionally a function of other parameters beyond only the DM and supported rate. For example, gaps may be provided for different signal to noise ratios.

The "Gap-from-Supported-Rate" could be a fixed value for each (C&M,DM) pair. This value could either be stored in a lookup table or other storage structure, or readily obtainable via efficient calculations based on values stored in a lookup table or other storage structure. One embodiment of this operation is described in FIG. 5. The table could also be divided further into values that depend on other parameters, such as ranges of signal to noise ratios.

The RT potentially has other information pre-stored as well, such as e.g., receiver power-consumption information associated with each DM.

In other embodiments, the "Gap-from-Supported-Rate" is not fixed for the C&M-DM pair, but is additionally a function of other parameters. As mentioned, one such parameter is a target bit-error rate, whereby the "gap" for a given (DM, C&M) can depend on a target bit-error-rate. Thus, the "gap" can be a function of some absolute bit-error rate, some range of bit error rates, or some percentile bit error rate. The gap used by the selection algorithm can be adjusted based on a target error-rate value, such a value coming from an application or other requirement. Other parameters can be functions of the estimate of the channel. For example, in some of the decoders described herein, the channel estimate defines mathematically a tree structure used in the decoding of transmitted bits. The performance of the decoder can depend on this tree, and thus the channel.

In another example, applicable to OFDM systems that use multiple tones, the "gap" can depend on a measure that considers jointly channel estimates for all tones. For example, in a multi-tone case, the system may be able to support a number of C&M options giving the same rate. However, among such options, if a sufficient number of tones are deemed to have favorable characteristics, such as high SNR or high scattering, then the "gap" could be reduced for a C&M option particularly suited for this case, e.g. a C&M option with a sufficiently low rate outer code. Similarly, some DMs are more favorable to the case where channels from different tones are either more or less correlated. The correlation between channels of different tones can then drive the "gap" calculation.

General Principles Used for the MIMO Transmission System

The building blocks in a typical MIMO system that is dealt with in embodiments of this invention consist of OFDM for wideband transmission, a family of QAM constellations, a code-modulation transmission scheme, and a family of outer binary codes for use with the scheme. One embodiment uses a bit interleaved coded modulation scheme (BICM). These are all known to those familiar with the state of the art.

In one embodiment, the family of binary outer codes include, for example, turbo codes, regular convolutional codes, rate-compatible punctured convolutional (RCPC) codes, low-density parity check (LDPC) codes, or any combination of these codes. Such families of SU-MIMO systems are well suited for adaptive rate/decoder-module selection. This can be achieved by changing the constellation size and/or the rate of the outer binary code.

The family of decoder modes at the disposal of each receiver may include one or, preferably, multiple decoder module options. In general, there may be a choice of multiple decoder structures per coding mode with different performance complexity trade-offs. The overall detection at any given decoder module may or may not be performed iteratively.

The described C&M/DM adaptation modes can be used in the variety of multi-user environments. One system mode of operation is potentially a mode with OFDMA and scheduling. In this case, over each resource block for scheduling, feedback information data are provided by a subset of RTs (e.g., in the form of an index specifying the requested encoding and modulation parameters by the given receiver). These are used by the scheduler to choose the user (RT) to schedule over the given resource block as well as the coding and modulation parameters to use for transmission (these coincide with the ones requested by the scheduled user). Any standard scheduling algorithm can be employed including, but not limited to, proportional fair scheduling or other less delay-tolerant schemes. This includes also round robin scheduling, whereby rate/receiver adaptation is only performed by (and feedback information is only obtained from) receivers that are scheduled for transmission.

General Principles of the Selection Algorithm

In general, the classifier may choose the operating mode taking into account the performance/complexity trade-offs of the DM structures associated with different C&M coding modes. In general, the classifier's transceiver selection criteria may be RT or application dependent, and a variety of criteria can be used across distinct receiver devices. Such criteria can be accommodated by having gap from supported rate measures which depend on such criteria, and also including into the tables knowledge of measures such as decoder complexity. These gaps and complexity measures can be determined by offline tests which test various DM structures with different C&M modes for different channels. Tests can determine, for each channel, DM and C&M combination, measures such as bit-error rate in decoding, complexity of decoding (measured for example by instruction counts), battery usage, etc. A key thing to note is that each DM option may be tested with multiple C&M modes, and each C&M mode may be tested with multiple DM options. Statistics of complexity measures can then be used populate tables of such measures, e.g. tables for a given mean complexity with associated bit error rates, tables for given mean bit rates with associated complexity, etc. Such tables, in real time, can then be used to either select appropriate gaps or further refine decisions.

Figure 5:
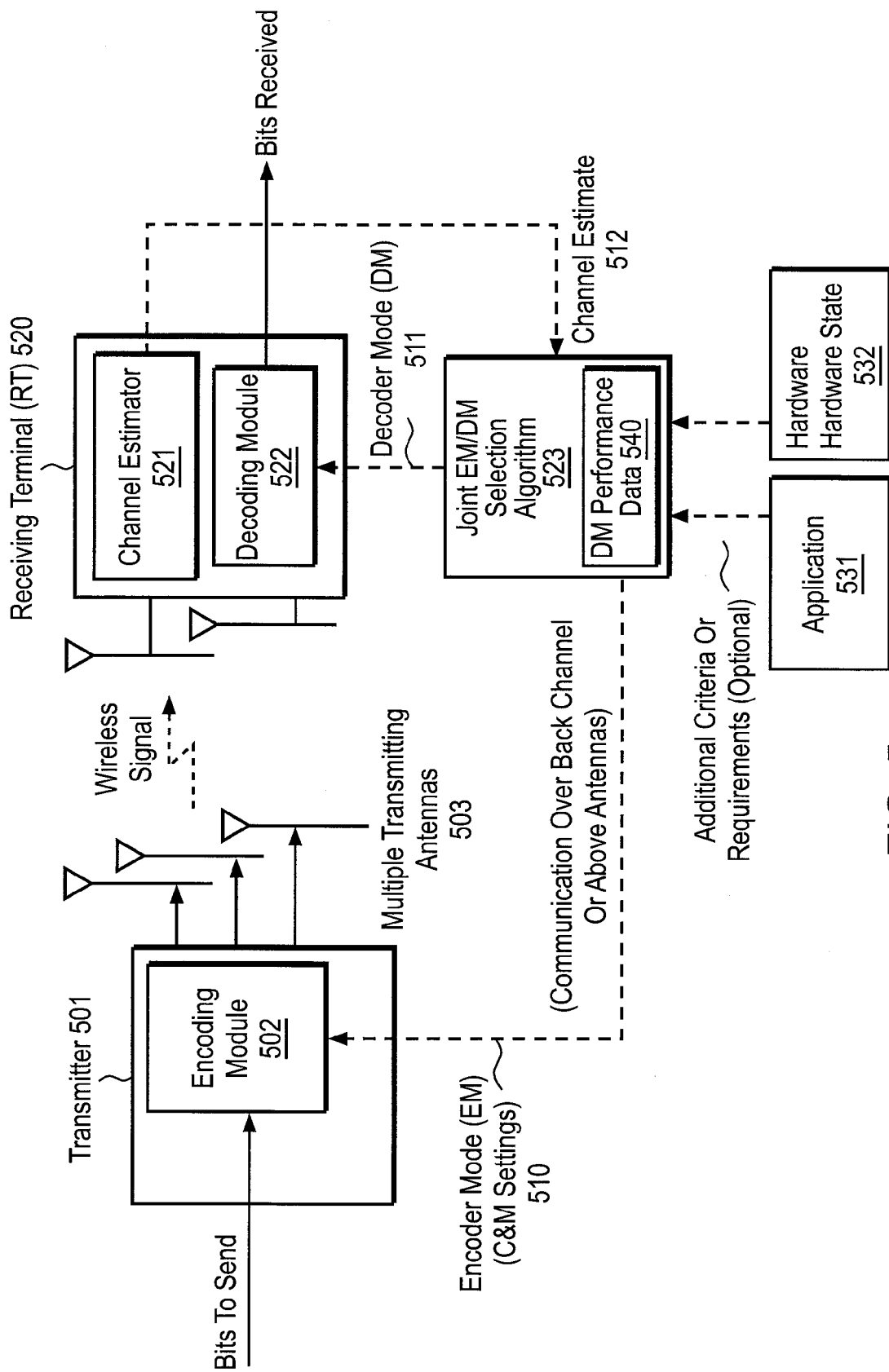
FIG. 5 depicts a system block diagram that illustrates the channel classification and rate adaptation and receiver mode selection functions.

One embodiment of a selection process is shown in relationship to the system (transmitter and RT) in FIG. 5. A flowchart of one embodiment is given in FIG. 6. A detailed look of the elements in one embodiment of the selection process, including optional elements, is shown in FIG. 7.

To begin, the selection algorithm determines which (C&M, DM) pairs are feasible given the estimate of the channel. It then sorts through this list depending on other criteria.

As one example, one set of RT criteria involves using modes for which the frame-error rate does not exceed a target value, and among those modes selects the one that yields the highest transmission rate. In that case for each combination of encoding mode, EM, and DM, the RT determines whether or not this is a feasible joint (EM, DM) mode, e.g., whether or not communication for the given mode on the given channel will result in a frame error that does not exceed the pre-specified target error-rate level. Among all the feasible (EM, DM) modes, the subset yielding the highest possible rate would be identified. If there is more than one pair supporting the same highest possible rate, one of those (EM,DM) modes would be selected using another criterion (e.g., the one with the lowest receiver complexity) as the preferred encoder/decoder mode by the receiver.

As another example, the RT's selection criteria might comprise a utility function that captures the combined effect of the transmission rate, energy usage constraints at the receiver, the frame-error rate, and/or potentially other constraints and variables.

Detailed Description of Various Embodiments

In one embodiment, the described adaptation scheme is applied in the context of coded OFDM/MIMO transmission with bit interleaved coded modulation (BICM). It can be readily applied in multi-user cellular environments whereby the OFDM time/frequency slots are partitioned into resource blocks and SU-MIMO transmission is scheduled over each resource block. The described receiver-driven transceiver adaptation techniques can be used either just for transmission, or for scheduling and transmission.

Embodiment of a Coded Modulation System

Figure 2:
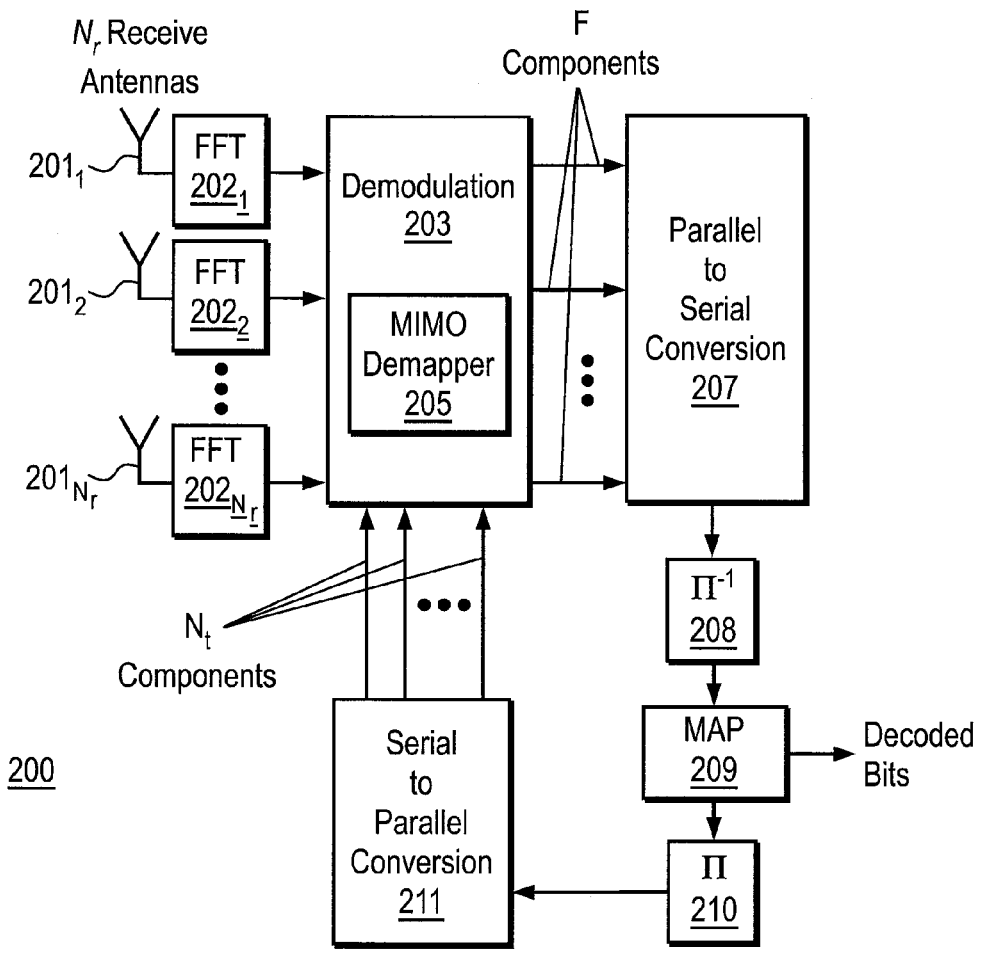
FIG. 2 illustrates one embodiment of a receiver structure for a MIMO/OFDM system with BICM/ID.

FIGS. 1 and 2 show the transmitter and receiver block diagrams for a MIMO/OFDM system with BICM and iterative decoding (ID). More specifically, FIG. 2 is a block diagram of one embodiment of a transmitter for space-time coding with bit-interleaved coded modulation (BICM) with OFDM modulation for wideband frequency selective channels. Referring to FIG. 1, transmitter 100 comprises (as an example) binary encoder 101, bit interleaver 102, serial-to-parallel converter 103, mapper modems $107_1$-$107_{Nt}$, inverse fast Fourier transform (IFFT) modules $108_1$-$108_{Nt}$, and transmit antennas $109_1$-$109_{Nt}$. Note that IFFT modules $108_1$-$108_{Nt}$ also include circular-prefix operations, which are performed in a manner that is well known in the art. Also the resulting sequences generated by the IFFT/circular prefix modules are converted into electrical continuous-time signals via pulse-amplitude modulation in a manner that is well known in the art.

To perform BICM encoding to the data, binary coder 101 applies a binary convolutional code to the input bits (input data) 110. Bit interleaver 102 then interleaves the encoded bits from convolutional coder 101 to generate bit-interleaved encoded bits. This bit interleaving de-correlates the fading channel, maximizes diversity, removes correlation in the sequence of convolutionally encoded bits from convolutional coder 101, and conditions the data for increased performance of iterative decoding. Convolutional coder 101 and bit interleaver 102 may typically operate on distinct blocks of input data, such as data packets.

After performing bit interleaving, bit-mapping and modulation and OFDM are applied to the bit-interleaved encoded bits. Serial-to-parallel converter 103 receives the serial bit-interleaved encoded bit stream from bit interleaver 102. Note that serial-to-parallel converter 103 may include a framing module (not shown) to insert framing information into the bit stream, which allows a receiver to synchronize its decoding on distinct blocks of information. Serial-to-parallel converter 103 generates a word of length $N_t$ long, with each element of the word provided to a corresponding one of mapper modems $107_1$-$107_{Nt}$. Elements of the word may be single bit values, or may be B bit values where B is the number of bits represented by each modem constellation symbol.

Each of mapper modems $107_1$-$107_{Nt}$ converts B bits to corresponding symbols (of the Q-ary symbol space, with $Q=2^B$). The output of each modem mapper 107 is a complex-valued symbol (or equivalently two real-valued samples, representing the real and imaginary parts of the complex-valued symbol). Each of IFFT modules $108_1$-$108_{Nt}$ collects up to F symbols, and then applies the IFFT operation of length F to the block of F symbols. F is an integer whose value can typically range from 64 to 4096, or larger and depends on the available transmission bandwidth, the carrier frequency, and the amount of Doppler shifts that need to be accommodated by the system. Thus, each of IFFT modules $108_1$-$108_{Nt}$ generates F parallel subchannels that may be transmitted over the corresponding antenna among $109_1$-$109_{Nt}$. Each subchannel is a modulated subcarrier that is transmitted over the channel.

Figures 3, 4:
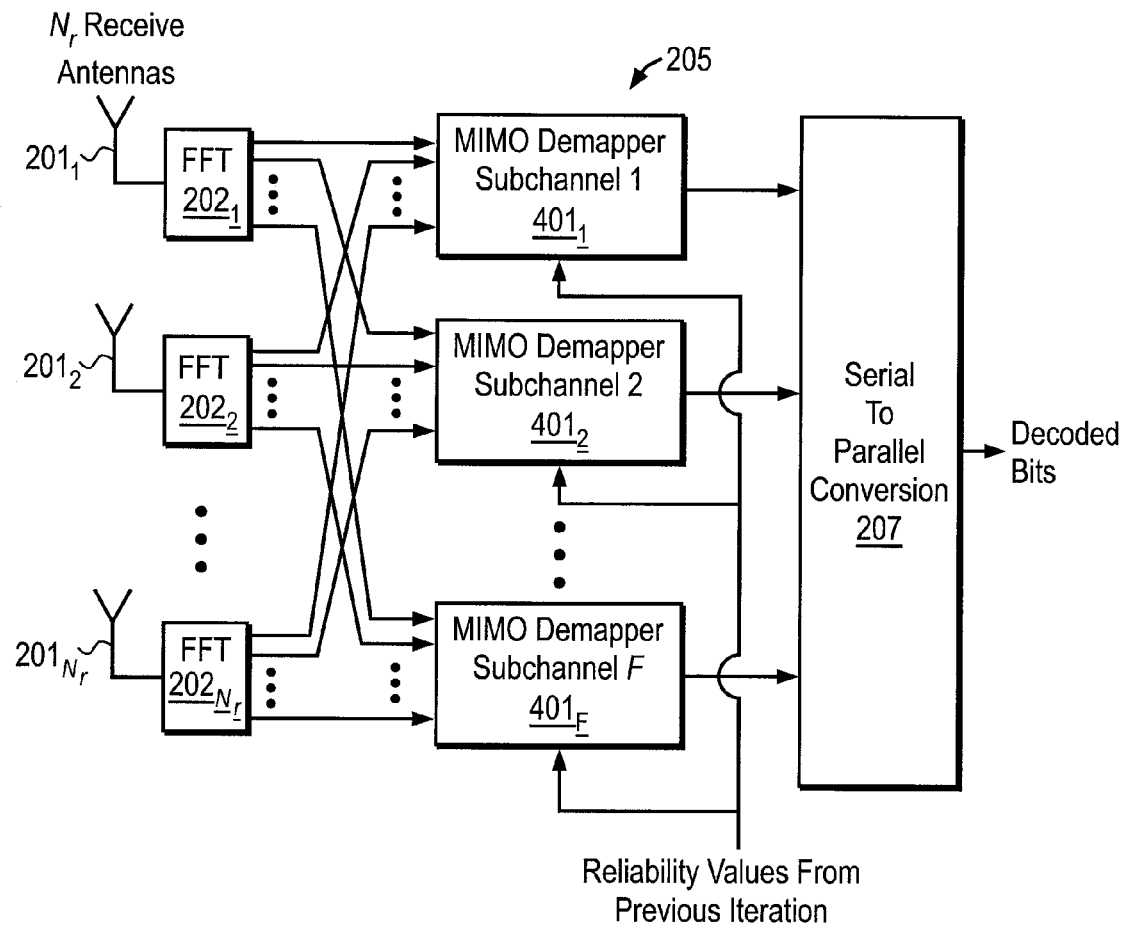
FIG. 3 illustrates a more detailed embodiment of a receiver structure for the different SOMA detectors for the different OFDM tones for the MIMO/OFDM system with BICM/ID.
FIG. 4 illustrates an example of a set partition type mapper for 16 QAM.

In one embodiment, the transmitter and receivers have an equal number of transmit and receive antennas, i.e., $N_t=N_r=N$. The binary information-bearing signal, hereby denoted as $u_k$, is encoded first at the transmitter by an outer binary code using convolutional coder 101, generating a coded sequence $c_k$. This sequence is interleaved by a bit interleaver 102. Then, each of mapper modems $107_1$-$107_{Nt}$ maps groups of B interleaved bits at a time into $2^B$-QAM symbols. The resulting QAM symbols are multiplexed through the N transmit antennas $109_1$-$109_{Nt}$ in a round-robin fashion and OFDM transmission is applied over each antenna using IFFT modules $108_1$-$108_{Nt}$. FIG. 4 shows a representative mappings for B=4, referred to as a set partition type mapper for 16 QAM for use in iterative decoding. This type of mapper is sometimes suitable for BICM with iterative decoding (ID). Other mappers such as the well known Gray Mappers may also be used.

As described further below, in one embodiment, the transmitter includes a controller and a memory that are communicably coupled to binary coder 101 and mapper modes 107$_1$-107$_{Nt}$ to control which coders, mappers, and modems are used. A memory stores a library of binary outer coders and a library of mappers and modems that the transmitter may use. In one embodiment, the set of mappers and modems comprises one or more of Gray mappers with BPSK, QPSK, 16-QAM, 64-QAM, 256-QAM, 1024-QAM, and 8-PSK, and set partition mappers for 16-QAM, 64-QAM, 256-QAM, 1024-QAM, and 8-PSK. The specific configuration of mappers, modems and outer codes is implemented with a hardware or software switch in the transmitter, in a manner well-known in the art.

In response to the feedback from the receiver, the controller causes a binary coder and a mapper modem to be loaded into binary coders 101 and mapper modems 107$_1$-107$_{Nt}$. Note that memory may be external to the transmitter.

FIG. 2 is a block diagram of one embodiment of a receiver having an iterative decoder for the space-time code for the OFDM system. Referring to FIG. 2, receiver 200 comprises receive antennas 201$_1$-201$_{Nr}$, fast Fourier transform (FFT) modules 202$_1$-202$_{Nr}$, demodulator/detector 203, parallel-to-serial converter 207, bit deinterleaver 208, decoder 209, bit interleaver 210, and serial-to-parallel converter 211. Although not shown, each of the FFT modules 202$_1$-202$_{Nr}$ is preceded by front end that performs filtering, sampling, and a circular-prefix-removal operation.

For a wideband system, receiver 200 performs OFDM demodulation for each of receive antennas 201$_{1-Nr}$, and the demodulation and demapping is performed over F parallel subchannels. The ith receive antenna 201(i) senses a signal made up of various contributions of the signals transmitted from the N$_t$ transmit antennas (i.e., contributions of the multiple F parallel, narrowband, flat fading subchannels transmitted over corresponding antennas 109$_1$-109$_{Nt}$ of FIG. 1). Each of FFT modules 202$_1$-202$_{Nr}$ apply an F-point FFT to the corresponding signals of receive antennas 201$_1$-201$_{Nr}$, generating N$_r$ parallel sets of F subchannels.

In one embodiment, demodulator/detector 203 estimates bits in each of the F subchannels along with reliability (soft-output) information on each of these bit estimates. Multi-input multi-output (MIMO) demapper 205, based on the N$_r$ parallel sets of F subchannels from FFT modules 202$_1$-202$_{Nr}$, produces soft estimates of the demapped bits (i.e., bits mapped from the constellation symbol) in each of the F subchannels from the N$_t$ antennas in the transmitter. In one embodiment, in one coding mode, the decoder is employed with multiple iterations (Nit>1). In that case, for each iteration except the last one, MIMO demapper 205 produces the estimates of the demapped bits and reliability information about these bits using also reliability information generated by soft-output decoding (followed by reinterleaving) by decoder 209, which acts as a MAP decoder. Note that in the last iteration as the soft-output of decoder 209 is not further utilized, simpler versions of decoder 209 can be generated (e.g., based on the well-known Viterbi algorithm) which do not produce soft output. The number of iterations in such an embodiment, given a specific demapper design for 205, could constitute a family of DMs, each DM corresponding to an iteration count. Other DMs could be produced by different designs of demapping modules 205.

FIG. 3 is a block diagram of one embodiment of MIMO demapper 305 having MIMO joint demapper units for the different OFDM tones/subchannels. Referring to FIG. 3, each signal of the N$_r$ receive antennas 201$_1$-201$_{Nr}$ is divided into F subchannels (via demodulator 204, not shown in FIG. 3) by applying an FFT operation and sending its output to the corresponding subchannel MIMO demappers 301$_1$-301$_F$. The signal outputs of the kth subchannel for all N$_r$ receive antennas are provided to the kth subchannel MIMO demapper 301(k). After the first iteration reliability information is provided to the kth subchannel MIMO demapper 301(k), using extrinsic information generated by the output of decoder 209 at the previous iteration. This extrinsic information is deinterleaved and passed as input to MIMO demapper 205 in the next iteration.

Returning to FIG. 2, the estimates of bits in F parallel streams from MIMO demapper 205 together with reliability values for those bits are provided to parallel-to-serial converter 207 along with the extrinsic reliability information on each one of these bits. The reliability information is computed as the difference between the output reliability values for those bits (produced by demapper 205) and the input reliability values for those bits (inputs to demapper 205). The converter 207 reconstitutes the estimate of the BICM encoded bit stream generated by the transmitter, which was estimated by the receiver 200. The estimated BICM encoded bit stream (and the extrinsic reliability information) is then deinterleaved by bit deinterleaver 208 and applied to decoder 209 to reverse the convolutional encoding applied by the transmitter. The reverse operation in this case corresponds to generating estimates of the bit values of the information bit stream that is the input to binary coder 101, and also producing extrinsic information that is to be passed back (after reinterleaving) to MIMO demapper 203 as new reliability information.

In all decoder iterations except the last one, extrinsic information is produced by decoder 209 and is first applied to bit interleaver 210. Bit interleaving aligns elements of the extrinsic information with the interleaved estimated BICM encoded bitstream from MIMO demapper 205. In addition, the interleaved extrinsic information is applied to serial-to-parallel converter 211, which forms N$_t$ parallel streams of extrinsic information corresponding to the parallel bit streams formed at the transmitter.

The extrinsic information is exchanged between MIMO joint demapper 205 and decoder 209 to improve the bit error rate performance at each iteration.

In one embodiment, the receiver also includes a controller and a memory, which stores libraries of inner demappers and outer decoders that may be selected by the receiver as coding modes. In one embodiment, the library of inner demappers comprises a non-iterative MMSE demapper, an iterative MMSE demapper, a non-iterative SOMA-based demapper with an MMSE front-end, an iterative SOMA-based demapper with an MMSE front-end, a MAP demapper, a MaxLogMAP demapper, and soft-output spherical decoders. In one embodiment, the library of outer decoders comprises at least two of a Viterbi decoder, a MAP decoder, a MaxLogMAP decoder, a turbo decoder and soft-output Viterbi algorithm. Note that it is not required to have each of the inner demappers and outer decoders listed. Also, other demappers and outer decoders may be used as well.

Based on a channel classification performed by the receiver, the controller causes the MIMO demapper and the outer coders to be adapted as described above. For example, a given DM option specifies the types of design of each module, how information is used by demappers, and the number of iterations. The specific inner demapper and outer decoder configuration is implemented with a hardware or software switch, in a manner well-known in the art.

The SU-MIMO structure shown in FIGS. 1 and 2 is very well suited for rate adaptation. Both the rate of the outer binary code and the size of the QAM modulation constellation can be used to this end. Multiple outer binary code—modulation constellation pairs may be used to achieve the same rate. This adapts such DM structures to different EM (equivalently C&M) options.

Embodiments of Outer Binary Codes and Modulation (Modems)

To allow for rate adaptation, a set of possible C&M transmission operating modes are used, whereby
1. a given operating mode's "C" is uniquely identified by the rate of the outer code and potentially other parameters such as the type of the code and its memory (thus many codes with the same rate, but different designations of "C" may be used), and
2. a given operating mode's "M" specifies the type of modem or constellation, which includes not only the size of the mapping/constellation, but the points, mapping of bits to symbols, etc.

In one embodiment, the outer binary code list (code library) includes punctured convolutional codes, perhaps with different memory sizes (number of decoding states). This is a convenient and flexible class of codes to use in the adaptation. In one embodiment, rates are chosen from $\frac{1}{4}$ to $\frac{9}{10}$. In one embodiment, memories range from 4 to 6 to 8.

More powerful codes may also be included, such as, for example, but not limited to, turbo codes and LDPC codes, in the library. RCPC codes may also be considered, especially for unequal error protection in media transport systems. Such codes may also have their own options for decoding, such as the number of iterations within the decoder of the turbo code itself. These options can further produce new decoder design options, and thus additional DM options.

In another embodiment, the list of modulation (modem) choices are from the QAM family, 4 QAM, 16 QAM, 64 QAM 256 QAM or 1024 QAM. In principle, other modem classes may also be included, such as PSK signal constellations.

In addition, other space-time coding structures, besides the ones depicted in FIG. 1, can be included. In one embodiment, the list of coding and modulation options is expanded to included transmission schemes that are modified versions of those shown in FIG. 1, and include a space-time block code (STBC) operation. The STBC module takes as input the output of the "Mapper/Modem" modules in FIG. 1, and its outputs are used as inputs to the FFT modules in the figure.

Embodiments of Decoding Modes

It is assumed that each receiver has at its disposal for each C&M (EM) at least one decoder mode, and preferably several decoder modes, potentially spanning a large range of performance complexity trade-offs.

One of the simplest decoder modes that could be used as options at the receiver involves an inner-outer decoder structure of the form of FIG. 2, consisting of MMSE-based inner demappers cascaded with a maximum likelihood hard-output outer-code decoder.

A somewhat more complex case involves iterative MMSE-type decoders, whereby the outer decoder is a soft output decoder, such as, for example, a MAP or MaxLogMAP decoder, and the inner decoder is a conditional (adaptive) MMSE-type soft-output inner decoder.

Other, higher-performance higher-complexity, decoder modes may perform iterative (and non-iterative) decoding with soft-output MAP or MaxLogMAP decoders and more complex inner demappers, such as Soft-Output M-Algorithms (SOMA), Spherical Decoders, MCMC type, and even MaxLogMAP or MAP inner decoders.

As mentioned before, iterative decoders are a simple way of taking a single decoding algorithm and providing multiple "decoder modes" by specifying the number of iterations to be used.

The mentioned codes, modems, and receiver component systems are merely examples of embodiments. Other candidates may be chosen. For instance, the list of {encoding, decoding} module pairs at the disposal of a receiver may also include "STBC" options, involving encoders of the form of FIG. 1 modified to include STBCs along with associated decoder modes.

Embodiments of the Selection Module

An embodiment of the invention proposes RT-driven joint adaptation of the coding and modulation parameters (EM), the transmission scheme used by the transmitter, and the decoding mode (DM) used at the receiver.

In an embodiment, the receiver is assumed to have at its disposal the following:
1. A list of C&M modes (EMs), each mode comprising, e.g., an outer code description (e.g., code type, memory and rate), and a modem choice (size of QAM constellation, symbol points, bit to symbol mapping);
2. A list of decoder modes (DMs), each module comprising, e.g., a decoder type, and a set of decoding parameters.
3. A set of lookup tables (LUTs) or other storage structures, providing, for each viable (C&M,DM) combination, performance values (e.g., "gap from capacity" values), decoding complexity values (e.g., MIPS values), etc. The values may be fixed values. They may themselves be functions requiring input, e.g. a bit-error-rate. In one embodiment, these LUTs are generated off line are either pre-stored at (or pre-fetched by) the receiver.
4. A set of receiver-dependent criteria for selecting the preferred mode of operation, corresponding to the coding and modulation parameters to be used for transmission and the associated decoding module. These are given by the user, application, RT-state, RT-design/hardware, etc.

In one embodiment, an encoding-mode indexing lookup table is available for each user/receiver. This table indexes all the possible modes that can be of use to a given receiver. The table is available to both the transmitter and the receiver.

FIG. 5 provides a simplified block diagram that summarizes where one embodiment of the selection/adaptation operates in a system.

Referring to FIG. 5, joint EM/DM selection module 523 jointly selects the EM and DM modes in response to a channel estimate 512 from channel estimator 521 of receiver terminal 520 and optional additional criteria or requirements, including, application specific information and requirements 531 and hardware and/or hardware state information 532.

The application specific information may include application-specific constraints such as, for example, a bit-error rate, packet-error rate, block-error rate, frame-error rate, application required bitrate, and a QoS metric.

Transmitter 501 includes an encoding module 502 that receives an encoder mode (EM) signal 510 specifying C&M settings from joint EM/DM selection module 523 of receiver terminal 520. In response to the EM signal 510 as a feedback signal, encoding module 502 generates an encoding signal representing the bits to send, using the specified encoding mode. The encoded signal is transmitted over transmit antennas 503.

Joint EM/DM selection module 523 also specifies the selected DM to the decoding module 522 using DM mode signal 511. In response to DM mode signal 511, decoding module 522 decodes, receives signals using the specified decoding mode to generate the bits received.

Figure 6:
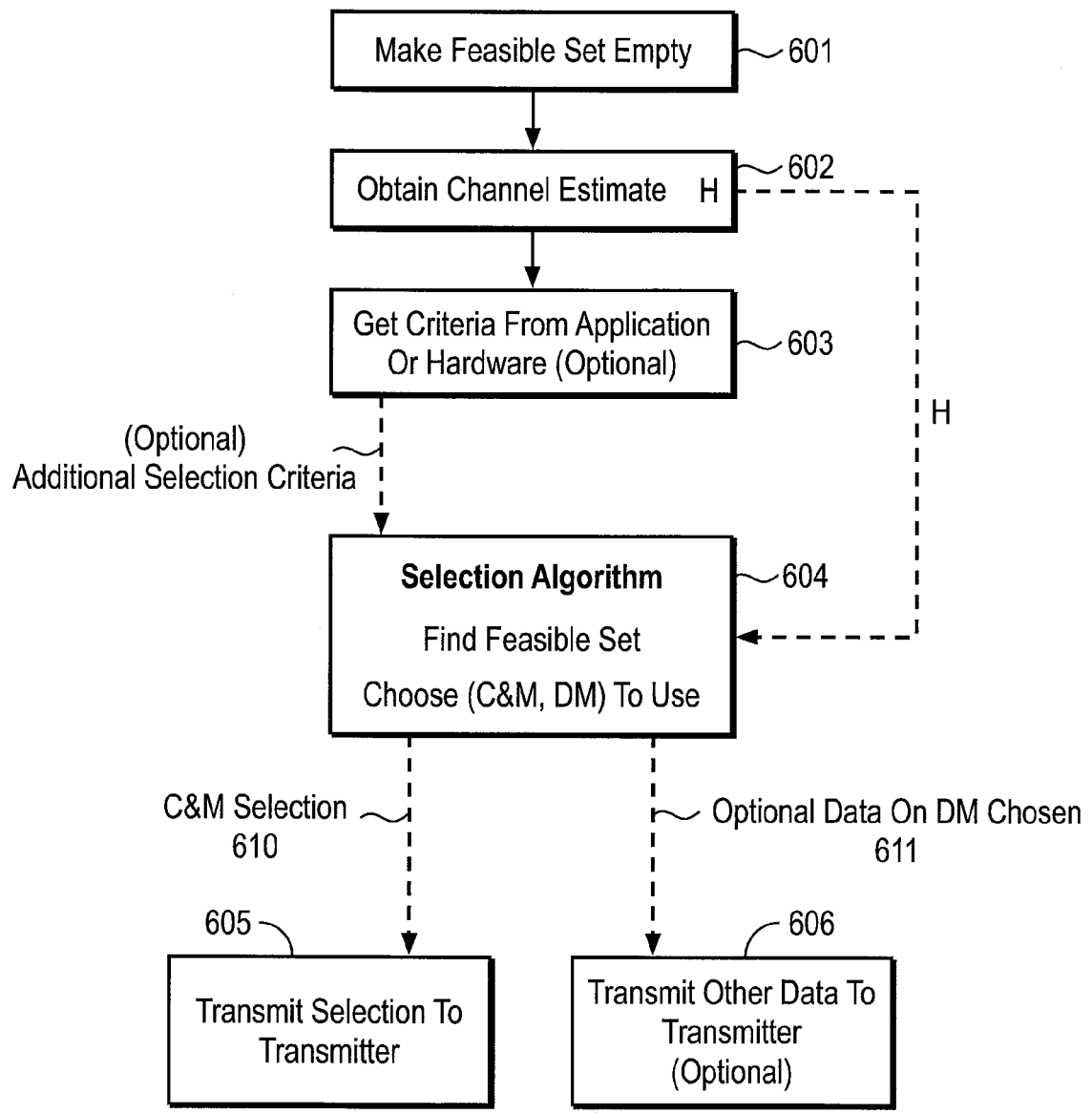
FIG. 6 is a flow design of one embodiment of a selection process.
Figure 7:
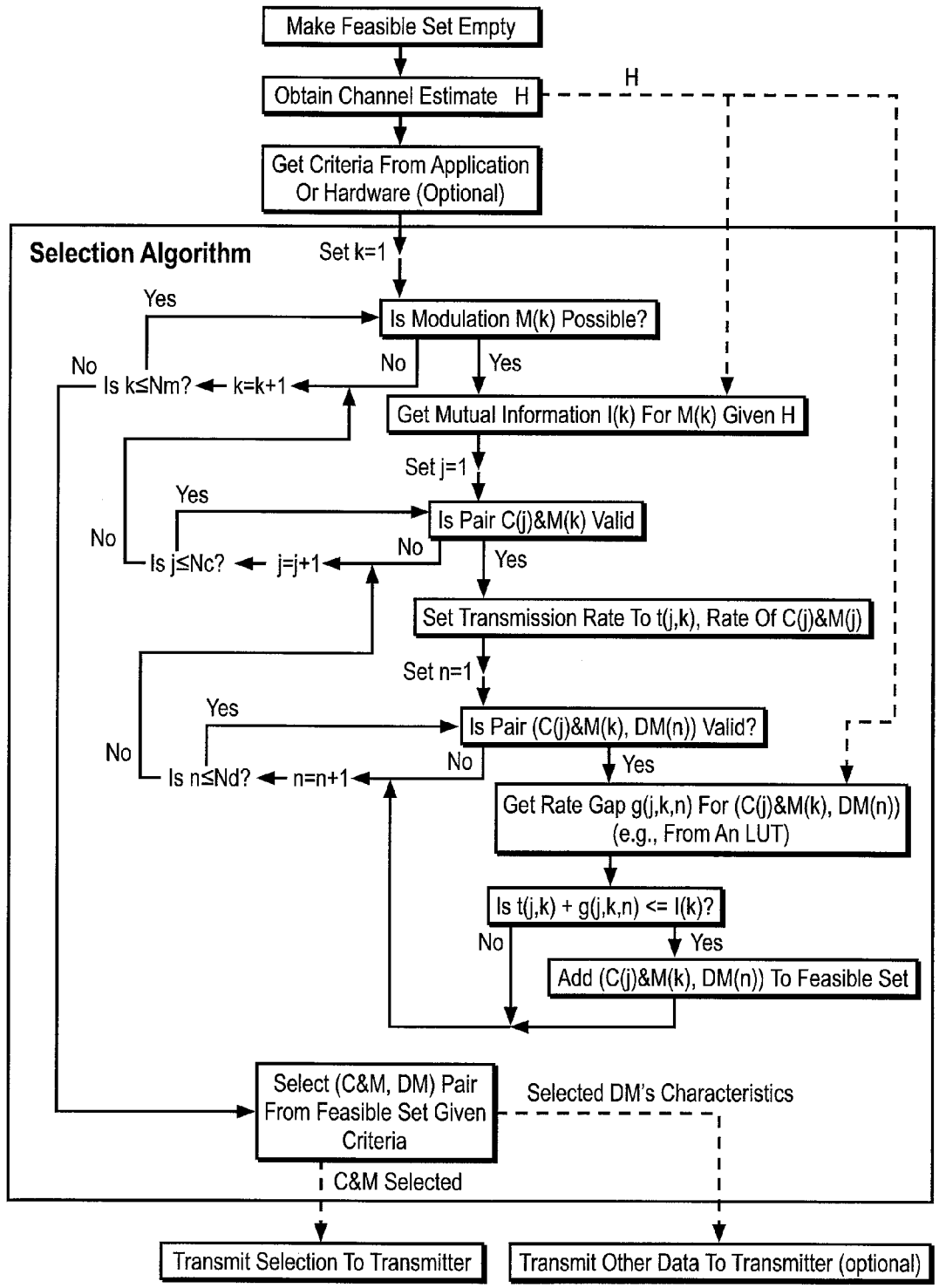
FIG. 7 is a flow design of one embodiment of a selection algorithm.

FIG. 6 is a flow diagram of the operation of one embodiment of the joint EM/DM selection process performed by the receiver terminal of FIG. 5. The process is performed by processing logic that may comprise hardware (e.g., dedicated logic, circuitry, etc.), software (such as is run on a general purpose computer system or a dedicated machine) or a combination of both.

Referring to FIG. 6, the process begins by processing logic making the feasible set of EM/DM pairs empty (processing block 601). Next, processing logic obtains a channel estimate H (processing block 602). In one embodiment, processing logic also obtains criteria from at least one application on the receiver and/or hardware (including hardware state information) (processing block 603).

In response to these inputs, processing logic performs the selection algorithm to find a feasible set of EM/DM pairs and then selects one pair to be used (processing block 604). Thereafter, processing logic transmits the C&M selection 610 to the transmitter (processing block 605) and optionally transmits other data (e.g., selected DM characteristics) to the transmitter (processing block 606).

FIG. 7 provides an embodiment of the algorithm for choosing the rate/code mode (that is to be fed back to the transmitter) and the decoder module of preference at the receiver. This embodiment does an exhaustive search over combinations of coding "C", modulation "M" and decoder mode "DM". It assumes "Nc" coding options labeled C(1), C(2), ..., C(Nc), "Nm" modulation options labeled M(1), M(2), ..., M(Nm), and Nd decoder mode options DM(1), DM(2), ..., DM(Nd). One can also think of a different embodiment which simply goes through the possible (C(j)&M(k), DM(n)) pairs taken from a valid list.

In one embodiment, this selection is based on first finding feasible EM&DM selections at the receiver given an estimate of the channel, then including receiver-based optimization criteria and complexity/performance LUTs into the process to make the final decision. Note that the main receiver elements highlighted in FIG. 5 are the channel state estimation and the channel classification units at the receiver (which are not explicitly shown in FIG. 2). In one embodiment, the receiver channel-state information is based on pilot symbols inserted in the OFDM system at the transmitter. (It should be noted that such pilots are also required in open-loop SU-MIMO systems in order to gather channel state information at the receiver). Then the system calculates an estimate of the supportable rate, one estimate for each of the possible modem choices over this particular channel. This is done for each possible encoding mode (outer code/modem) by use of a calculation of an estimate of the capacity supported by this channel, e.g., by an estimate of the mutual information between the input (transmitted signal from the transmit antennas) and the output (received signal over the receive antennas). This capacity estimate is modem specific, i.e., in general, it takes into account the limitations on capacity imposed by the use of the particular modem. The supported rate calculation can be made for the entire band, for sub bands or for individual tones. For the case of subbands, an outer code, interleaver and modem unit is required for each band as well as a matching receiver. The supported rate is then modified given a gap from rate value, which is specific to (EM&DM) pairs and also possibly criteria such as a target bit error rate. This allows the selection module to find which (EM&DM) pairs are feasible. Among feasible pairs, other criteria, such as DM complexity as stored in LUTs which can also be a function of criteria such as target bit error rates, are used to make a final selection. The selected EM defines the pair of outer code type and parameters (e.g., code type, rate, memory) and modem. This EM mode is then communicated to the transmitter for rate adaptation. The information about the selected DM (receiver mode) is only required at the receiver end. The receiver and the transmitter are of course tuned to using the identical signal constellation and outer code over a certain subband and time interval.

In order to illustrate how one embodiment of the supported rate calculation and selection operates, consider the case of transmitting to a user over a single OFDM tone (or, equivalently, a resource block within the coherence bandwidth of the channel). Assuming there are $N_t$ transmit antennas and $N_r$ receive antennas the received signal over the given OFDM tone is of the form $$y(n) = \sqrt{\frac{\rho}{N_t}} Hx(n) + w(n)$$

where H denotes the $N_r \times N_t$ channel matrix (on the given OFDM tone), x(n) denotes the $N_t \times 1$ vector of coded signal transmitted by the $N_t$ transmit antennas (the ith element of x(n) denotes the sample transmitted over the nth use of the channel), $\rho$ denotes the large-scale signal-to-noise ratio (SNR), and y(n) and w(n) denote a (possibly scaled) version of the associated $N_r \times 1$ received and noise vector signals respectively. The samples of the input (transmitted) coded signal x(n) take on values in the discrete set X, where X is a constellation of points on the complex plane. In one embodiment, X denotes a set of QAM constellation symbols, with Q points in the constellation. It is also assumed that the transmission scheme can operate at many different coding modes. In one embodiment, each mode corresponds to a particular choice of X (e.g., a particular choice of Q when only QAM constellations are considered), in conjunction with an outer code type (e.g., a convolutional code, block code, or LDPC code), and a particular choice of an outer-code rate, $R_c$, and potentially other coding parameters (e.g., the memory of the code used).

The overall transmission rate (in bits per channel use), R, of any such mode is equal to the product of $R_c$ the number of transmit antennas, the base-2 logarithm of Q (i.e., $\log_2 Q$), and $N_r$. It is assumed that the coding and modem modes (including the family of outer codes, e.g., a family of punctured convolutional codes, or a family of LDPCs, or turbo codes, the associated coding parameters, and the possible constellations) are all given and known to the transmitter and the receiver.

EXAMPLE 1

As an example, a 64-QAM constellation supports the transmission of $\log_2 64=6$ bits/sec/Hz/antenna. When used with a code of rate $R_c=8/10$ the effective information rate is 8*6/10=4.8 bits/sec/Hz/antenna. If a system has $N_t$=6, when the system has an effective rate of 6*4.8=28.8 bits/sec/Hz.

Pilots are used at the receiver to estimate the channel H, and the resulting channel estimate of H is passed as input to the channel classifier. The channel classification method employs as a base metric (for selecting the transmission rate, R, along with the actual C&M and DM) the following conditional mutual information quantity:

$$I_H(H) = I_H(x, y \mid H = H) = E\left[\log_2 \frac{p(y \mid x, H)}{p(y \mid H)} \;\Big|\; H = H\right].$$

This depends on the channel and the modulation/modem used. In a closed-loop receiver-driven transceiver-adaptive scheme, the receiver measures H=H from the downlink pilots and computes $I_H(H)$ for all modem constellations at its disposal.

EXAMPLE 2

For a 16-QAM constellation each element of the vector "x" is transmitted over one of the antennas and can take one of the 16 possible QAM constellation values. The maximum possible information that can be transmitted in this case is 4 bits/sec/Hz/antenna. The mutual information gives the maximum rate that can be supported with this constellation above for a given H. This is less than or equal to 4 bits/sec/Hz/antenna.

For example, for $N_t=N_r=4$ the mutual information above could be 10 bits/sec/Hz. This would mean that code rates with rate higher than 10/16 would not be considered for transmission since they would result in effective transmission rates above 10/bit/sec/Hz which cannot be reliably supported by the given channel. Thus code rates less than or equal to 10/16 would have to be used. However, this is not the full story, as not all of these codes would be necessarily feasible. Indeed, the ability to support a given rate depends also on other factors taken into account by the invention, as in the "rate gap" mentioned.

Then for each possible choice of {encoding mode, decoder module} pair that the receiver may use, the receiver determines whether or not the given mode (pair) is a feasible mode, e.g., whether or not it allows transmission without violating the target QoS (e.g., frame error-rate constraint). That is, feasible is used to mean that the pair satisfies a desired performance property over the channel, such as, for example, the target QoS In one embodiment, this is done by comparing for each mode the overall rate of the code against the capacity $I_H(H)$ associated with the used modem constellation decreased by some suitable "rate gap". This performance gap depends on the family of outer codes considered and the associated decoder module considered (together with its parameters). Its value is fetched from (pre-stored at the receiver) performance LUTs (or other storage). The receiver then uses its own set of mode-selection criteria to select one from all the feasible modes and requests the associated outer code/modem combination from the transmitter.

In other embodiments, the "rate gap" is additionally a function of other parameters, such as the desired bit-error rate, frame-error rate or parameters that are specific to a family of DMs (i.e., a subset of all the DMs sharing a common structure, such as e.g., MMSE-based receivers). To implement this the "Look up Tables" are not values but functions for each (C&M,DM) pair which take "H" (or a desired bit-error rate or frame-error rate) as an input.

EXAMPLE 3

Take the example above with $N_r=N_t=4$ and where for a 16-QAM constellation and the mutual information is 9 bits/sec/Hz. Assume in this example that for this H and for a 64-QAM constellation the mutual information is 10 bits/sec/Hz.

This would mean that for 16-QAM, code rates less than or equal to 9/16 have to be used, and for 64-QAM code rates less than or equal to 10/24 have to be used.

Now take a pair "(C&M3,DM6)" using 64-QAM that operates at 6 bits/sec/Hz with a rate gap of 4.3 bits/sec/Hz at a bit error rate of $10^{-6}$. The code rate would be 6/24 in the C&M option. This pair is not feasible since 10−4.3<6 bits/sec/Hz, i.e. while the operating rate seems fine the rate gap makes the pair infeasible. There may be another DM option, possibly higher complexity or a more advanced design, that lowers the rate gap sufficiently to allow for C&M3 to be feasible.

Going back to 16-QAM, there may be a pair "(C&M1, DM1)" using 16-QAM that operates at 6 bits/sec/Hz with a rate gap of 3.2 bits/sec/Hz at a bit error rate of $10^{-6}$. The code rate would be 6/16 in the C&M option. This pair is not feasible since 9−3.2<6 bits/sec/Hz, i.e. while the operating rate seems fine the rate gap makes the pair infeasible.

There may exist another pair "(C&M1,DM2)", using the same C&M but another receiver "DM2", where the gap is 2 bits/sec/Hz at a bit error rate of $10^{-6}$. This would be a feasible pair since 9−2≥6. One could expect that DM2 is a more advanced, and possibly more complex receiver, than DM1.

There may also exist another pair "(C&M2,DM3)", using a different C&M operating with 16-QAM at 5 bits/sec/Hz, implying a code rate 5/16 at a bit error rate of $10^{-6}$. This has another receiver "DM3", where the gap is 3.8 bits/sec/Hz. This would be a feasible pair, since 9−3.8≥5, and with the large "rate gap" could be a much less complex receiver than in the combination (C&M1, DM2).

Furthermore, it could be that the pair "(C&M1,DM1)" using 16-QAM operating at 6 bits/sec/Hz has a rate gap of 2.9 bits/sec/Hz if the bit error rate is $10^{-4}$. Since 9−2.9≥6 bits/sec/Hz the pair is feasible at a higher error rate. Thus, it may be considered for some applications.

Furthermore, for another H, giving the same mutual information as above, the rate gaps may change for these pairs.

EXAMPLE 4

In this example, assume for simplicity that there are 3 available choices for QAM constellations: 4, 16, 64-QAM. Also, assume that there are 5 possible outer code rates: 1/3, 1/2, 2/3, 3/4, 5/6. Then, in a 4×4 MIMO system, the rates provided by each (outer code, modem) combination are given by the following table:

|  | $R_c = 1/3$ | $R_c = 1/2$ | $R_c = 2/3$ | $R_c = 3/4$ | $R_c = 5/6$ |
|---|---|---|---|---|---|
| 4-QAM | 2.67 | 4 | 5.33 | 6 | 6.67 |
| 16-QAM | 5.33 | 8 | 10.67 | 12 | 13.33 |
| 64-QAM | 8 | 12 | 16 | 18 | 20 |

For example, using an outer code with rate $R_c=\frac{2}{3}$ and 16-QAM yields a transmission rate of $4\times4\times\frac{2}{3}=10.67$ bits/sec/Hz. Now assume that for a given measured channel 4×4 H at the RT, the channel mutual information is 8 bits/sec/Hz for 4-QAM, 14.2 bits/sec/Hz for 16-QAM and 15.1 bits/sec/Hz for 64-QAM. First, note that on this channel, EMs using 64-QAM with $R_c=\frac{2}{3}$, $\frac{3}{4}$ and $\frac{5}{6}$ are not feasible since their operating rates (16, 18, 20 bits/sec/Hz, respectively) exceed the associated channel mutual information (15.1 bits/sec/Hz for 64-QAM). Note also that the highest-rate EMs that are not excluded based on channel mutual information are those using $R_c=\frac{5}{6}$ and 16-QAM, and operating at 13.33 bits/sec/Hz (which is below 14.2 bits/sec/Hz, i.e., below the mutual information for 16-QAM). Whether or not any such EM is feasible depends on whether or not there exist (EM, DM) pairs with $R_c=\frac{5}{6}$ and 16-QAM, and with rate-gap from capacity less than 14.2−13.33=0.87 bits/sec/Hz. Assume that no such (EM, DM) is at the disposal of the RT, i.e., that all (EM, DM) pairs at the RT's disposal with $R_c=\frac{5}{6}$ and 16-QAM, have rate gaps larger than 0.87 bits/sec/Hz. Then the RT considers the EMs achieving the next largest operating rate. These are EMs with ($R_c=\frac{3}{4}$, 16-QAM) or with ($R_c=\frac{1}{2}$, 64-QAM), yielding 12 bits/sec/Hz. Lets assume that there are 6 possible (EM, DM) pairs in each case, defined by the outer code memory (Mem=4, 6, 8) and the decoder module type (DEC-1, DEC-2). [The set of all "possible" (EM,DM) pairs in general depends on the RT, as well as other criteria, such as, e.g., maximum allowed power usage, that may vary with time within the RT and may restrict the set of available operating modes.] Assume that complexity increases (and performance improves) when "Mem" is increased or when DEC-2 is used instead of DEC-1. For example, assume that the rate-gap values (in bits/sec/Hz) for all these pairs are as shown in the table below:

| $R_c=\frac{3}{4}$, 16-QAM | | | $R_c=\frac{1}{2}$, 64-QAM | | |
| --- | --- | --- | --- | --- | --- |
| | DEC-1 | DEC-2 | | DEC-1 | DEC-2 |
| Mem = 4 | 4 | 2.6 | Mem = 4 | 3 | 2.7 |
| Mem = 6 | 3.8 | 2.1 | Mem = 6 | 2.8 | 2.2 |
| Mem = 8 | 3.6 | 1.5 | Mem = 8 | 1.8 | 1.6 |

In the case ($R_c=\frac{3}{4}$, 16-QAM), notice that no (EM, DM) pair using DEC-1 is feasible, since all these pairs have rate gaps larger than 2.2 bits/sec/Hz, i.e., larger than the difference between 14.2 bits/sec/Hz (the mutual information for 16-QAM) and 12 (the provided rate). The only feasible (EM, DM) pairs in this case correspond to Mem=6 with DEC-2 and Mem=8 and DEC-2. Between the two pairs, the one corresponding to Mem=6 would be in general preferred in mobile RTs, being the least complex option. In the case ($R_c=\frac{1}{2}$, 64-QAM), notice that all (EM, DM) pairs are feasible, since all these modes have rate gaps that do not exceed 3.1 bits/sec/Hz, i.e., they do not exceed the difference between 15.1 bits/sec/Hz (the mutual information for 64-QAM) and 12 (the provided rate). Between all six (EM, DM) pairs, the one corresponding to M=4 and DEC-1 would be in general preferred in mobile RTs, being the least complex option. Whether or not this is also preferred over the (EM, DM) pair corresponding to ($R_c=\frac{3}{4}$, 16-QAM, Mem 6, DEC-2) would in general depend on comparison between the complexity cost (and on possibly other parameters) of the two (EM, DM) pairs.

As shown in the above example, other factors may be included in the decision. In one embodiment, mode selection at the receiver is based on a criterion that tries to maximize the rate delivered to the receiver. In this case, the receiver finds among all feasible (C&M, DM) pairs those achieving the maximum supported rate and selects one of those modes for transmission (if multiple modes achieve the same rate).

In one embodiment, the rate/code selection algorithm at the receiver obtains a mutual information metric (estimate) $I_H$ and tests each individual code (or coding mode) independently to see whether or not the code is "feasible" on the given channel. "Feasible" means that the rate of the code does not exceed the mutual information of the channel minus a pre-calculated "rate gap from capacity" that is specific to that coding mode and to the receiver structure employed. These "rate gap from capacity" numbers are estimated a priori for each combination of coding mode ($R_c$, Q) and decoder structure, and are stored in LUTs at the receiver (see FIG. 5).

In one embodiment, when multiple modes achieve the same rate, the receiver selects the mode at random. Alternatively, the receiver may chooses the preferred rate-maximizing mode by also considering the receiver complexity of all the rate-maximizing (encoding, decoding) module pairs, as provided by "computational complexity" LUTs (pre-stored at the receiver). Such LUTs are determined offline during the design of user equipment, using tests are previously described, and included into the terminal as part of ROM or RAM. Data in LUTs can also be described mathematically, and recovered by the terminal by execution of a mathematic equation which has as input variables which depend on the module pairs. After consideration of such additional data such as complexity, a choice is made and the coding/modem choice is then fed back to the transmitter.

In one embodiment, involving a receiver with a rate-maximizing objective, once the feasible coding modes are calculated, the set of feasible modes with the highest rate and the lowest receiver complexity (lowest power consumption) are identified, and one of those modes is chosen. The coding/modem choice is then fed back to the transmitter.

In one embodiment, involving a receiver with a rate-maximizing objective subject to a max-power objective, once the feasible coding modes are calculated, the set of feasible modes not exceeding the required power constraint are chosen (the power objective may be a per-frame max-power objective, or a maximum power objective on the power used over all the frames or bits transmitted so far). Among those modes, the ones with the highest rate and the lowest receiver complexity (lowest power consumption) are identified, and one of those modes is chosen. The coding/modem choice is then fed back to the transmitter.

In general, the receiver's optimization criteria for selecting one (or none) from the feasible modes may include a utility function that captures objectives, such as target-bit-error rate, or QoS media-based performance objectives, power or energy constraints at the mobile, and other variables and constraints at the mobile. Once the feasible coding modes are calculated, the feasible mode with the best utility function value is identified, and its coding/modulation choice is fed back to the transmitter.

In general, the resource block over which the transceiver-adaptive transmission is considered may involve a set of F possibly distinct channels $H_1, H_2, \ldots, H_F$. In one embodiment, the receiver performs the aforementioned classification by using in place of the "single MIMO channel" $I_H(H)$ above the average of $I_H(H_1), I_H(H_2), \ldots, I_H(H_F)$. In one embodiment, typically involving tones with strongly coherent channels, groups of two or more channels may be approximated by a common "group" representative channel, prior to performing the aforementioned mutual information averaging and transceiver selection.

This classification operation can be repeated at each frame. The feedback operation can be employed after each frame, after a preset number of frames, or in an adaptive fashion, e.g., whenever there is a "significant" change in the output of the classifier.

Embodiments to Calculate or Approximate the Mutual Information

Although, in principle, the actual mutual information can be used for channel classification, these computations can be computation-demanding for $N_r > 1$. Indeed, computation of several $N_r$-dimensional integrals would be required in a brute-force calculation of $I_H(H)$ for each modem constellation. To keep the complexity of the mobile receiver terminal be kept as low as possible, some embodiments obtain accurate estimates of $I_H(H)$ with substantially reduced computation overhead. In one embodiment, an upper bound can be used as an estimate of the metric. One such upper bound is given as the minimum of two quantities: (i) the product of the base-2 logarithm of the size of the constellation (i.e., Q) and $N_t$; and (ii) the base-2 logarithm of the determinant of the matrix $I+(\rho/N_t) H H^H$, where I is an identity matrix of dimensions $N_r \times N_r$, $\rho$ denotes the signal to noise ratio, and $H^H$ denotes the transpose conjugate of H. In one embodiment, often yielding significantly more accurate mutual-information estimates, a lower bound to $I_H$ is computed instead by taking into account the limitations imposed by the modem constellation. Approximate versions of such lower bounds can be obtained in a very computationally efficient way. These methods decouple the computation of the mutual information between a set of $N_t$ transmitted steams and a set of $N_r$ received samples, into $N_t$ separate computations, each involving the mutual information between one transmitted stream and one "processed" received sample (obtained via linear processing of the received samples over all received antennas). Obtaining each of these mutual information terms involves calculating one-dimensional integrals. The values of these integrals can be computed very efficiently via interpolation from pre-tabulated values.

Other Elements of Embodiments

Multi-user cellular systems also exploit the use of schedulers, which select the users that are scheduled within each resource block within each cell. In one embodiment the transmitter (base station) can also exploit the feedback parameters to schedule the users according to their rate (or coding scheme) requests, depending on any suitable downlink-scheduling algorithm. For example, the base station scheduler can implement proportional fair scheduling (PFS), or any other form of scheduling on each resource block, based on the user-rate feedback messages on each resource block.

In one embodiment, groups of tones representing a resource block are scheduled (or considered for scheduling) per user (in an extreme case all the tones can be considered for a single user). In that case, many different selection algorithms are considered, one for each channel matrix. In one embodiment, the encoder-decoder adaptation method is run independently on each of these channels, based on the result of the associated channel classification. This results in providing distinct coding modes on different subsets of tones allocated to that user. In one embodiment, a common coding mode is chosen for transmission over the whole group of tones allocated to a specific user. This common coding mode can be estimated as described above at the receiver and fed back to the transmitter. Alternatively, the individual coding rates on different tones can be fed back to the transmitter, and the transmitter can then select a common coding rate for (potentially only a subset of) all the bands. In yet another embodiment, one or more "common" coding modes are chosen across all the tones in the system and the feedback information from each user is used by the scheduling algorithm to select users complying with a particular common operating mode.

Advantages of Embodiments of the Invention

In MIMO systems, the encoding mode (EM) and decoding mode (DM) choices can be non-trivial and strongly inter-related. Given the inter-relation, the main benefit of embodiments of the invention is that the joint selection will result in higher performance by the system since the practical aspects of the interplay between the EM and DM are directly accounted for in the decision process. In addition, application and terminal requirements such as bit-error-rate performance and complexity can be also be directly accounted for in the decision process.

To describe this in more detail, in one embodiment of the invention, the rate of the SU-MIMO system is jointly matched to the supportable rate of the channel given the encoder mode, the complexity/performance characteristics of the library of decoder modes available at the receiver, and RT's constraints and optimization criteria. Attempting to use a SU-MIMO system at a rate that is too high in comparison to a channel rate that can be supported leads to an outage event. Likewise, operating the SU-MIMO at too low a rate relative to that which can be safely supported by the channel means that the system is under-performing. Operating the SU-MIMO too close to the maximum supportable rate may (for some channel cases) come at an affordable cost in complexity while other times it might be prohibitively computationally expensive, and another lower-rate mode might be preferable at the receiver. Also, it often is the case that two distinct outer code rate/modem combinations can provide the same overall effective rate, but one of rate/modem combinations may allow achieving the target QoS performance with simpler (lower complexity receivers). The proposed receiver-driven encoder/decoder selection mechanisms allow such adaptations to be performed in a systematic computationally efficient manner.

Another advantage of an embodiment of the invention is its simplicity of operation, and its ability to provide the relevant information needed by conventional scheduling algorithms. For instance, in the context of a proportional fair scheduling algorithm, this type of encoder/decoder adaptation scheme could provide (among other parameters or criteria) the maximum rate that a user deems "achievable" on the given MIMO channel given its bank of coding modes, library of decoder modes, constraints and optimization criteria. This quantity then suffices for performing proportional fair scheduling in these systems. In contrast, feeding back CQI type parameters (in MIMO systems) does not provide sufficient information to the transmitter for effectively scheduling transmissions. Indeed, the CQI information may not be an accurate indicator of the encoding modes that can be supported. For instance, two channels with the same CQI but different channel scattering richness levels can have drastically different achievable rates for a given choice of a modem. Furthermore, CQI makes no provisions for decoder performance, decoder complexity, user receiver constraints such as a power or battery budget, and user-based performance criteria.

The metrics and code/decoder selection process described herein are designed to capture achievable rates over these MIMO channels, when actual encoding/decoding module pairs are jointly considered. They also readily take into account the receiver constraints or objectives in their selection of an encoder/decoder pair. Indeed, in general the proposed selection algorithm may choose the operating mode taking into account the performance/complexity trade-offs of the receiver structures associated with different coding modes. For instance, depending of the available battery resources (or user-selected battery usage settings), the classifier may consider different subsets of receiver structures in selecting the coding scheme. In a "low receiver-complexity" setting at a mobile receiver, a coding mode with a lower effective rate might be selected to guarantee low power usage.

Furthermore, application requirements can also be accounted for in determining the performance of the DM options (and can dictate the way DM "performance" is calculated). It could allow the RT to provide applications with better matched data streams, in terms of rate and/or error characteristics.

Finally, the rate required in the feedback channel by the receiver-driven encoder/decoder adaptation technique is very low. Assuming there is a total of T operating coding modes (e.g., combinations of constellation, outer binary code type and outer binary code rate), a total of at most $\log_2 T$ bits of feedback are only required. In general, the required feedback cost may be even significantly smaller, as only a small set of modes may be viable choices over any given (sufficiently small) range of large-scale SNRs.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless communication system comprising:
a transmitter that is operable to transmit wireless signals using any of a plurality of encoding modes representing one or more transmission rates; and
a user terminal having a receiver comprising
a decoding module to decode communications from the transmitter over a multiple-input, multiple output (MIMO) channel using a decoding mode selected from a plurality of decoding modes, wherein at least one of the encoding modes is operable with more than one of the decoding modes, and
a joint selection module to jointly select the decoding mode from the plurality of decoding modes to be used by the user terminal with an encoding mode from the plurality of encoding modes to be used by the transmitter, the joint selection based on being able to successfully transmit a corresponding data stream at a rate given by the encoding mode given channel conditions, and additionally the joint selection based on a combination of receiver-dependent criteria corresponding to the jointly selected decoding mode and encoding mode; channel information, receiver hardware and state, and application-specific constraints, the joint selection module being operable to send information to identify the selected encoding mode to the transmitter using a feedback channel.

2. The system defined in claim 1 wherein the characteristics of encoding modes comprise channel code design characteristics and modulation characteristics.

3. The system defined in claim 2 wherein the channel code design characteristics comprises one or more of code rate, code type and code memory.

4. The system defined in claim 2 wherein the modulation characteristics comprises one or more of constellation size, constellation points, and the mapping of bits to constellation points.

5. The system defined in claim 1 wherein the application-specific constraints comprise at least one of a bit-error rate, packet-error rate, block-error rate, frame-error rate, and a QoS metric.

6. The system defined in claim 1 wherein the receiver hardware and state indicate availability of receiver resources, the resources comprising a determination of an acceptable number of operations that may be performed and hardware resources that may be used in the decoding operation for a given transmission given resources the receiver determines can be used, the determination being based on the hardware state, and further wherein the hardware state defines one or more resources including the computational power of processors in the receiver, available power usage of the receiver, available battery life of the receiver, and usage of resources for other applications.

7. The system defined in claim 1 wherein the receiver further comprises a channel estimator to generate a channel estimate based on measurements, the channel estimate being an estimate of the communication channel between a transmitter and the receiver.

8. The system defined in claim 1 wherein the receiver further comprises:
a list of encoding modes, wherein at least one encoding mode in the list of encoding modes comprises one or more of an outer code description and a modem choice;
a list of decoder modes, wherein at least one decoding mode in the list of decoding modes comprises one or more a decoder type and one or more decoder parameters; and
a set of look up tables to store one or more of performance data and decoding complexity measures associated with each viable pair of encoding and decoding modes from the list of encoding and decoding modes.

9. The system defined in claim 8 wherein the outer code description comprises one or more of code type, memory and rate, and wherein the modem choice comprises one or more of QAM constellation size, symbol points and bit to symbol mapping.

10. The system defined in claim 8 wherein the one or more decoder parameters comprise one or more of decoder iterations, and other decoder-type specific parameters.

11. The system defined in claim 1 wherein the receiver further comprises:
a list of encoding modes, wherein at least one encoding mode in the list of encoding modes comprises one or more of an outer code description and a modem choice;
a list of decoder modes, wherein at least one decoding mode in the list of decoding modes comprises one or more a decoder type and one or more decoder parameters; and
a set of look up tables to store values of parameters of an algorithm based on performance data and decoding complexity calculations.

12. The system defined in claim 1 wherein the joint selection module is operable to:
 obtain a channel estimate;
 obtain criteria from one or more of an application running on the receiver and hardware on the receiver;
 identify a set of viable pairs of encoding and decoding modes based on the channel estimate and the criteria from the application or hardware on the receiver, wherein each of the pairs in the set is associated with one or more of performance values and decoding complexity values; and
 select one pair containing the encoding mode and the decoding mode from the set of viable pairs based, at least in part, on the receiver-dependent criteria and the one or more of performance values and decoding complexity values.

13. The system defined in claim 1 wherein the transmitter comprises an encoding module to change the encoding performed by the transmitter based on the encoding mode selected by the receiver.

14. The system defined in claim 1 wherein the application-specific constraints comprise the bit-error rate requirements of an application, available computational resources for decoding transmissions while the application is running, available memory resources for decoding transmissions while the application is running, anticipated or required power usage of the application over its anticipated or required running time, and tolerance of the application to wait for retransmissions of data that may be lost in transmission.

15. A terminal for use in a wireless communication system comprising a transmitter that is operable to transmit wireless signals using a plurality of encoding modes, the terminal comprising a receiver having
 a decoding module to decode communications from the transmitter over a multiple-input, multiple output (MIMO) channel using a decoding mode selected from a plurality of decoding modes, wherein at least one of the encoding modes is operable with more than one of the decoding modes; and
 a joint selection module to jointly select the decoding mode from the plurality of decoding modes to be used by the terminal with an encoding mode from the plurality of encoding modes to be used by the transmitter, the joint selection based on being able to successfully transmit a corresponding data stream at a rate given by the encoding mode with the given channel conditions, and additionally the joint selection based on a combination of receiver-dependent criteria corresponding to the jointly selected decoding mode and encoding mode, channel information, receiver hardware and state, and application-specific constraints, the joint selection module being operable to send information to identify the selected encoding mode to the transmitter using a feedback channel.

16. The terminal defined in claim 15 wherein the characteristics of encoding and decoding modes comprise code design characteristics and modulation characteristics.

17. The terminal defined in claim 15 wherein the application-specific constraints comprise at least one of a bit-error rate, packet-error rate, block-error rate, frame-error rate, application required bitrate, and a QoS metric.

18. The terminal defined in claim 15 wherein the receiver hardware state comprises one or more of the computational power of processors in the receiver, the available power usage and battery life of the receiver and the usage of such resources by other applications.

19. The terminal defined in claim 15 wherein the receiver further comprises a channel estimator to generate a channel estimate from measurements, the channel estimate being an estimate of the communication channel between a transmitter and the receiver.

20. The terminal defined in claim 15 wherein the receiver further comprises:
 a list of encoding modes, wherein at least one encoding mode in the list of encoding modes comprises one or more of an outer code description and a modem choice;
 a list of decoder modes, wherein at least one decoding mode in the list of decoding modes comprises one or more a decoder type and one or more decoder parameters; and
 a set of look up tables to store one or more of performance data and decoding complexity associated with each viable pair of encoding and decoding modes from the list of encoding and decoding modes.

21. The terminal defined in claim 15 wherein
 the outer code description comprises one or more of code type, memory and rate; the modem choice comprises one or more of QAM constellation size, symbol points and bit to symbol mapping; and
 the one or more decoder parameters comprise one or more of iterations and decoder-type specific parameters.

22. The terminal defined in claim 15 wherein the joint selection module is operable to:
 obtain a channel estimate;
 obtain criteria from one or more of an application running on the receiver and hardware on the receiver;
 identify a set of viable pairs of encoding and decoding modes based on the channel estimate and the criteria from the application or hardware on the receiver, wherein each of the pairs in the set is associated with one or more of performance values and decoding complexity values; and
 select one pair containing the encoding mode and the decoding mode from the set of viable pairs based, at least in part, on the receiver-dependent criteria and the one or more of performance values and decoding complexity values.

23. The terminal defined in claim 15 wherein the receiver further comprises:
 a list of encoding modes, wherein at least one encoding mode in the list of encoding modes comprises one or more of an outer code description and a modem choice;
 a list of decoder modes, wherein at least one decoding mode in the list of decoding modes comprises one or more decoder types and one or more decoder parameters; and
 a set of look up tables to store values of parameters of an algorithm based on performance data and decoding complexity calculations.

24. A method comprising:
 estimating a multiple-input, multiple output (MIMO) channel at a receiver in a wireless communication system, the channel for communications between a transmitter and the receiver;
 jointly selecting a decoding mode from a plurality of decoding modes to be used by the receiver with an encoding mode from the plurality of encoding modes to be used by the transmitter, the joint selection based on being able to successfully transmit a corresponding data stream at a rate given by the encoding mode given the channel conditions, and additionally the joint selection based on a combination of receiver-dependent criteria corresponding to the jointly selected decoding mode and encoding mod; channel information, receiver hardware and state, and application-specific constraints; and sending information to identify the encoding mode to the transmitter using a feedback channel.

* * * * *